(12) United States Patent
Hawes

(10) Patent No.: US 7,765,748 B2
(45) Date of Patent: Aug. 3, 2010

(54) CURBING COMPONENT OF A RAPIDLY DEPLOYABLE TEMPORARY MODULAR STRUCTURE

(76) Inventor: Raymond W. Hawes, 541, Pritchards Point Dr., Mt. Pleasant, SC (US) 29464

(*) Notice: Subject to any disclaimer, the term of this patent is extended or adjusted under 35 U.S.C. 154(b) by 0 days.

(21) Appl. No.: 12/540,823

(22) Filed: Aug. 13, 2009

(65) Prior Publication Data

US 2010/0007098 A1     Jan. 14, 2010

Related U.S. Application Data

(62) Division of application No. 12/144,156, filed on Jun. 23, 2008, now Pat. No. 7,578,111, and a division of application No. 10/776,565, filed on Feb. 11, 2004, now Pat. No. 7,389,621.

(51) Int. Cl.
*E02D 27/00* (2006.01)
*E04B 1/346* (2006.01)
*E04B 7/16* (2006.01)

(52) U.S. Cl. .................. 52/102; 52/29; 52/64; 52/74

(58) Field of Classification Search ............ 52/102, 52/29, 64, 74, 169.14, 239, 282.1–282.3, 52/647, 650.1, 654.1, 655.1, 696, 731.2, 52/731.7, 732.1, 741.1, 745.01; 277/637
See application file for complete search history.

(56) References Cited

U.S. PATENT DOCUMENTS

| | | | |
|---|---|---|---|
| 2,569,628 | A | 10/1951 | Craighead et al. |
| 2,618,820 | A * | 11/1952 | Struben et al. .............. 52/263 |
| 3,343,321 | A | 9/1967 | Axelsson |
| 3,559,357 | A | 2/1971 | Lowe |
| 3,676,972 | A | 7/1972 | Ballou |
| 3,782,048 | A | 1/1974 | Corman |
| 4,083,149 | A * | 4/1978 | Hickman et al. .............. 49/147 |
| 5,118,217 | A | 6/1992 | Younes |
| 5,590,504 | A | 1/1997 | Heard et al. |
| 5,592,789 | A | 1/1997 | Liddell et al. |
| 5,729,948 | A | 3/1998 | Levy et al. |
| 5,746,535 | A | 5/1998 | Kohler |
| 5,806,268 | A | 9/1998 | Koller |
| 6,185,887 | B1 | 2/2001 | Strassle |
| 6,397,551 | B1 | 6/2002 | Lewcock et al. |
| 6,427,396 | B1 * | 8/2002 | Harrison ...................... 52/202 |
| 6,446,406 | B1 | 9/2002 | Sauer |
| 6,969,211 | B2 | 11/2005 | Altman |
| 7,004,667 | B2 | 2/2006 | Ludwig et al. |
| 7,096,637 | B2 | 8/2006 | McMillan |
| 7,260,919 | B1 | 8/2007 | Spransy et al. |
| 2002/0059774 | A1 | 5/2002 | Collins |

(Continued)

*Primary Examiner*—Richard E Chilcot, Jr.
*Assistant Examiner*—Branon C Painter
(74) *Attorney, Agent, or Firm*—Davis & Bujold, P.L.L.C.

(57) ABSTRACT

Modular structural components and structural connections including chords and forming strips. Each chord has a generally elongated square main body of four main walls surrounding a central bore and having a T-slot structure adapted to accept a bolt type fastener extending along each exterior main surface. Each forming strip is an elongated plate formed into strip segments oriented at right angles to each other and forming a W-shaped corner region, a face region with a bolt hole and an attachment region, each region forming a mating bearing surface with a surface of a chord.

2 Claims, 15 Drawing Sheets

U.S. PATENT DOCUMENTS

2002/0083651 A1* 7/2002 Nomura et al. .................. 52/1
2002/0189191 A1 12/2002 Strassle et al.
2004/0120759 A1 6/2004 Altman

* cited by examiner

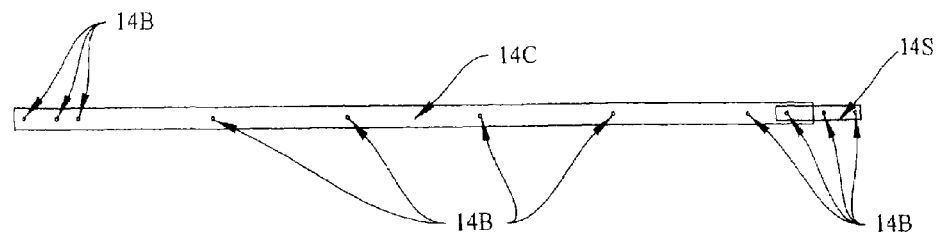
Figure 2A
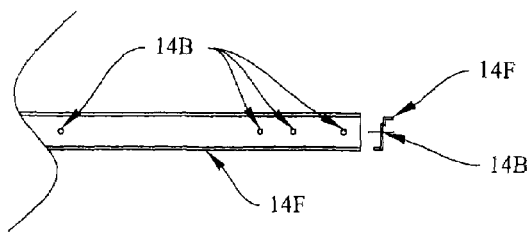
Figure 2B
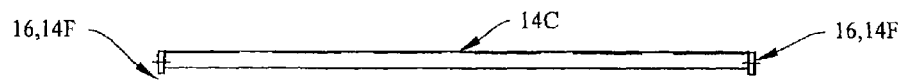
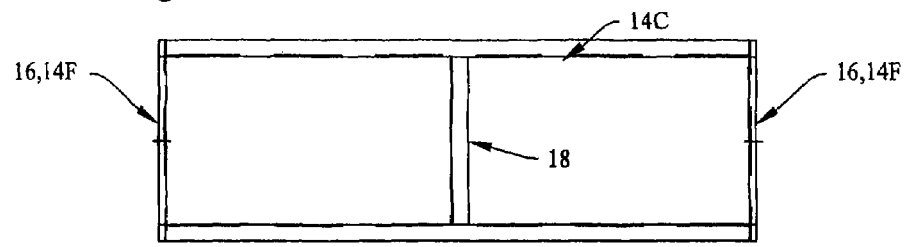
Figure 2C
Figure 2D

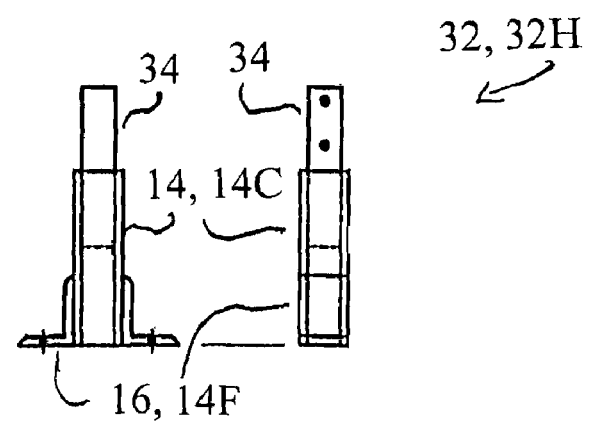
Fig. 2W
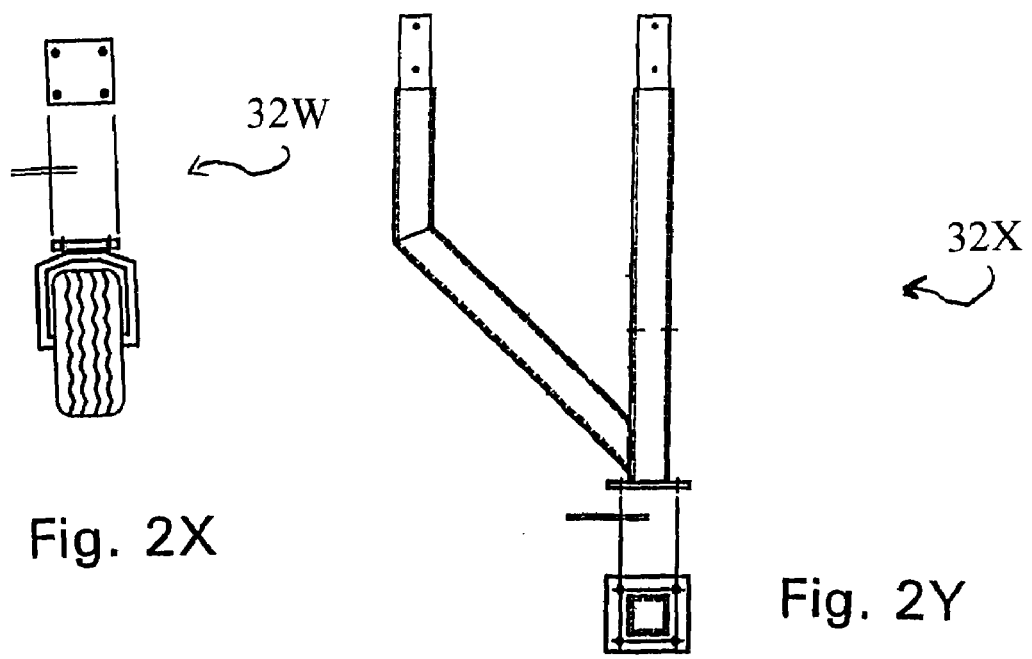
Fig. 2X
Fig. 2Y

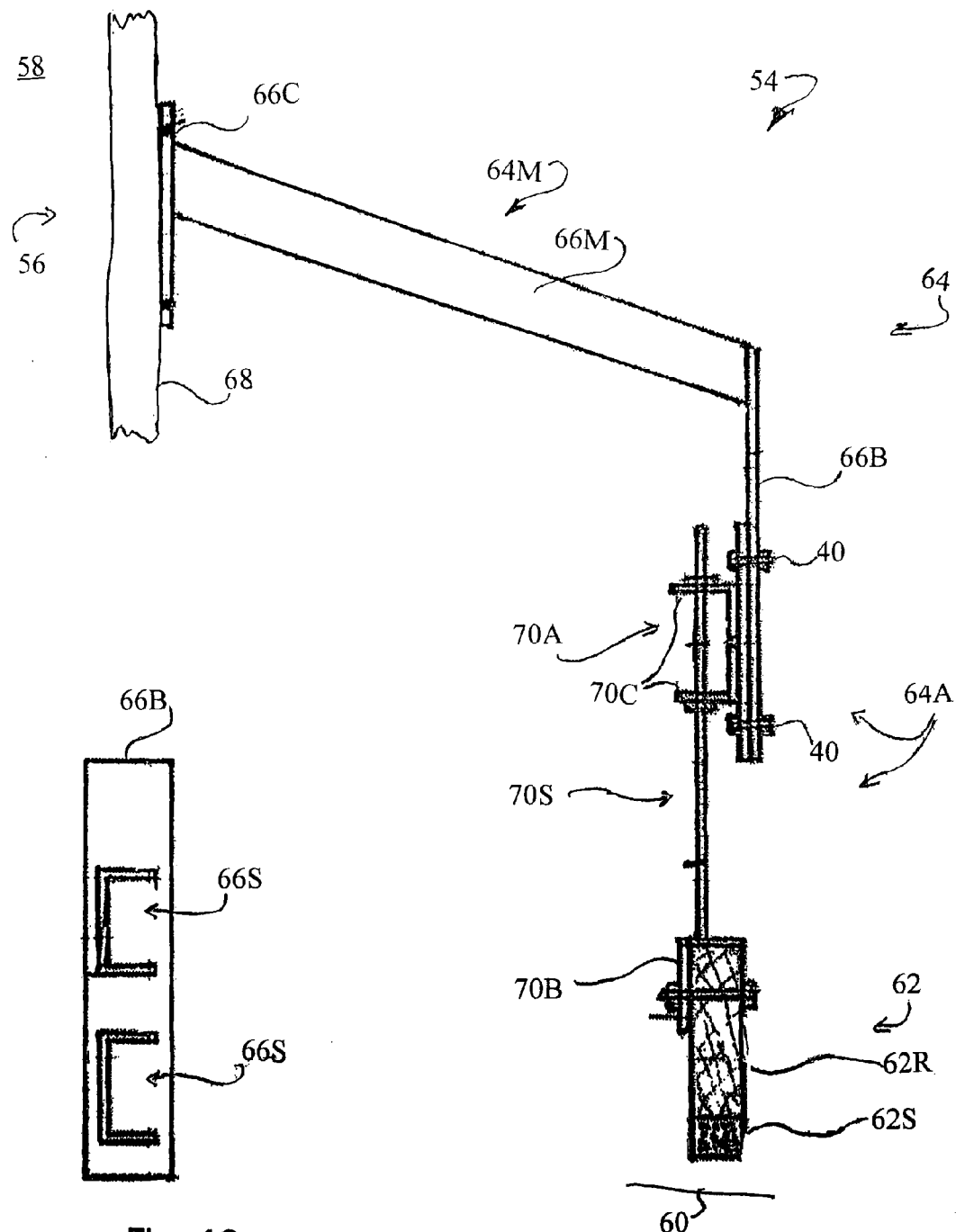

US 7,765,748 B2

CURBING COMPONENT OF A RAPIDLY DEPLOYABLE TEMPORARY MODULAR STRUCTURE

This application claims benefit of and is a divisional application of Ser. No. 12/144,156, filed Jun. 23, 2008, now U.S. Pat. No. 7,578,111, which claims benefit of and is a divisional application of Ser. No. 10/776,565, filed Feb. 11, 2004, now U.S. Pat. No. 7,389,621.

FIELD OF THE INVENTION

The present invention relates to a method and apparatus for a system of modular common components for constructing temporary structures capable of rapid deployment or construction for a wide range of purposes and that are capable of subsequent rapid modification, disassembly or removal.

BACKGROUND OF THE INVENTION

Temporary structures are commonly used in a wide range of industries and for a wide range of purposes. Typical uses of such temporary structures include, for example, providing access and work spaces for work on such structures as buildings, bridges, large storage tanks, dams, large machines, such as trains or ships, and so on, and the work may range from construction, modification or refurbishing of all or part of such structures to the demolishing of such structures. Uses of such temporary structures may further include, for example, the providing and support of an enclosure to protect the structure being worked upon from the environment, such as protecting a bridge being repainted or a building being constructed, or the workers and work processes, from rain, snow, sand, dust, winds and so forth. Such enclosures may also serve the reverse purposes, that is, providing and supporting an enclosure to protect the environment from by-products of the work being done within the enclosure, such as solid or liquid toxins, dust, spray and various forms of debris. In other instances, such a temporary structure may comprise the desired structure in itself, such as a short or long term warehouse, sports venue cover or any other desired form of shelter.

Temporary structures of this nature have been and are presently built in a number of ways, all of which have proven unsatisfactory for one or more reasons. For example, temporary scaffolding and framework structures have commonly been built from bamboo or wood, such as 2×4s, tied or nailed together. While the wooden structures and in particular the bamboo structures are relatively light in relationship to their weight and are comprised of relatively strong individual components, that is, 2×4s and bamboo stalks, their strength is limited by the inherent properties of the materials and they tend to be excessively flexible because a required relatively large number of joints are necessary due to limitations on the available lengths of the materials. Also, the joints and connections in such structures, which are typically fastened rope, twine, cord or nails, tend to be weak and excessively flexible and, as a result, tend to rotate about the joints. Such measures as are typically taken to make the joints in such structures stronger and more rigid, however, such as bolts or clenched nails, rapidly increase the cost and construction time of the structures, as well as the time required to disassemble the structures. Another disadvantage is that though the materials tend to be cheap and readily available the component elements are generally not readily reusable in subsequent structures, typically having been cut to specific sizes or damaged in use, thereby further increasing the costs of the structures.

Temporary structures have also been constructed from modular iron or steel piping sections fastened together with large metal pins or with bolts. While this type of structure is generally stronger and more rigid in both the elements and joints, and while the elements are typically reusable, the cost of the structure will be significantly greater. Also, the elements and resulting structures will be significantly heavier and will be correspondingly more difficult, complex and time consuming to transport, assemble and disassemble, and will often require a wide variety of different component elements as the individual elements are not readily modifiable to specific needs. Other implementations of such structure systems may use somewhat different materials, such as aluminum or plastic, and may use a variety shapes for the component elements, at least some being optimized for specific requirements, such as strength and weight or to provide a specific configuration, they have all been found to suffer from one or more of the above discussed disadvantages.

The requirements of a satisfactory system for temporary structures comprised of modular common components that are capable of rapid deployment and of subsequent rapid modification and disassembly and removal and that are capable of meeting a wide range of purposes are straightforward but are difficult to satisfy. For example, it is desirable that the components of a temporary structure system be of light weight and high strength, that the number of different types of component parts be limited, that the connecting elements be strong, rigid and inflexible, and that the components allow a structure to be configured to meet virtually any need, including enclosed structures having protective or containment properties. It is also desirable that the structural system thereby are capable of providing relatively light weight, strong, relatively rigid structures that are relatively simple and easy to transport and that will allow rapid assembly, modification and disassembly of the structures. It is also preferable that the structural materials be readily available and relatively inexpensive and that the components of the system be readily reusable, thereby significantly reducing the costs of any structure built by the system.

The modular temporary structural system of the present invention as described herein below provides solutions to these and other problems of the prior art.

SUMMARY OF THE INVENTION

The present invention is directed to an apparatus and method for a construction system including a plurality of types of modular structural components and connecting elements for construction of structures wherein each structural component includes and is based upon at least one of a plurality of structural elements and includes a connection structure formed of chords and forming strips for structurally attaching a first structural component to a second structural component.

According to the present invention, the structural elements common to the structural components include chords and forming strips.

According to the invention, each chord has a generally elongated main body having generally square cross section defined by four main walls surrounding a central bore and having four interior main surfaces and four exterior main surfaces and a T-slot structure extending along and centered on each exterior main surface. Each T-slot structure has an interior T-slot adapted to accept a bolt type fastener, each T-slot including a shaft slot extending inwards from an outer surface of the T-slot structure and connecting with a cross slot extending at a right angle to the shaft slot at an inner end of shaft slot.

Each forming strip is in turn formed by a single generally elongated strip plate formed into a plurality of strip segments wherein each strip segment is oriented at a right angle with respect to an adjacent strip segment. The strip segments are formed into regions including, in succession, a corner region forming a w-shaped cross section forming bearing surfaces mating with corresponding chord bearing surfaces formed by two adjacent main walls and an adjacent side wall of T-slot structure, a face region forming a bearing surface mating with chord bearing surfaces formed by outer face surfaces of the T-slot structure, and an attachment region extending outwards from an edge of the face region for stiffening of the forming strip.

According to the present invention, the bearing surfaces of a chord and of a forming strip form a mutually mating configuration such that up to four forming strips may be mated to a given location along a chord with each forming strip mating to a corresponding one of the four exterior main surfaces of the chord.

Also according to the present invention, each T-slot structure is defined by two parallel slot side walls extending outwardly in parallel from an exterior main surface of a chord and by two slot face walls extending inwardly from the outer edges of the slot side walls and parallel to the exterior main surface. In addition, at least one inner surface of each T-slot is a bearing surface to support compressive forces resulting from tensional and torsional forces imposed through a T-bolt and wherein each plane defined by an innermost face of each cross slot is offset inwardly with respect to a corresponding exterior main wall surface of the chord, thereby forming an increased and diagonal main wall thickness between planes defined by the interior surfaces of each cross slot and a corresponding exterior main surface of the chord.

Forming strips and chords are mated and connected by means of bolt-type connectors, which include standard hex-bolts and T-bolts wherein a T-bolt has a rectangular head portion longer than the width of a cross slot and narrower than a width of a shaft slot so that the head portion of a T-bolt can pass through the shaft slot and into the cross slot of a T-slot when the head portion of the T-bolt is aligned with a longitudinal axis of the T-slot and will be retained in the cross slot when the head portion is rotated to an orientation transverse to the longitudinal axis of the T-slot.

The structural components constructed of chords, forming strips and other elements in the system of the present invention may include straight chords, wherein a straight chord is a generally vertically oriented single chord having a plurality of bolt holes extending through the chord near the ends of the chord to allow attachment of the straight chord to another structural component; purlins, wherein a purlin is a generally horizontally oriented structural component including parallel structural elements interconnected by reinforcing elements and with a connection element located at each end of the purlin for attachment of the purlin to another structural component; trusses, wherein a truss is a generally horizontally oriented structural reinforcement component including parallel structural elements interconnected by reinforcing elements and with a connection element located at each end of the truss for attachment of the truss to another structural component; braces, wherein a brace is a structural reinforcement component that is generally oriented at an angle to the horizontal and that includes parallel structural elements interconnected by reinforcing elements and with a connection element located at each end of the brace for attachment of the brace to another structural component; brackets, wherein a bracket is a reinforcing element for attachment at an angle between two structural components and having a connection element at each end of the reinforcement element for attachment of the bracket to another structural component; roofing components, wherein a roofing component is a structural component comprised of structural elements arranged to form standard sections of roof structures and having at least one connection element for attachment of the roofing component to another structural component; and stubs, wherein a stub is a segment of a square cross section tubing dimensioned to slidingly fit within the bore of a chord and having at least one transverse bolt hole for receiving a bolt type fastener for connecting the stub into the bore of the chord.

Also according to the present invention, an attachment element is a segment of forming strip permanently attached to a structural component to mate with a chord of another structural component and having at least one bolt hole located for attachment of the segment of forming strip to the other structural component.

The structural components of the system of the present invention may also include curbing components, which include a sealing barrier positionable along a ground surface and parallel to a wall of the structure and forming a sealed barrier with the ground surface to prevent passage of the flowable materials along the ground surface and beneath the sealing barrier. The sealing barrier in turn includes a rigid barrier forming a barrier against the passage of the flowable material and a sealer mounted on a lower surface of the rigid barrier and forming a seal between the rigid barrier and the ground surface to prevent the passage of flowable material under the rigid barrier.

A curbing component includes a mounting bracket extending downwards and outwards from the wall for mounting an adjustable bracket to the lower part of the wall and the adjustable brackets mounts the sealing barrier to the mounting bracket by means of a barrier bracket on a lower end the adjustable brackets, thereby supporting the sealing barrier and allowing vertical positioning of the sealing barrier with respect to the ground surface. A mounting plate on the lower part of the mounting bracket attaches the adjustable bracket to the mounting bracket and has a quick release connection for supporting the adjustable mounting in either of two selectable vertical positions with respect to the mounting plate.

Also according to the present invention, a forming strip includes at least one bolt hole accepting a bolt type fastener for attachment of the forming strip to a chord by means of at least one of a T-bolt mating with a T-slot structure of the chord and a hex-bolt mating with a bolt hole extending traversely through the chord wherein the at least one bolt hole extends through the shaft slots and cross slots of opposing T-slot structures of the chord. In addition, at least selected ones of the structural components include bolt holes located near the ends of a structural element of a selected structural component and bolt holes spaced along the selected structural component for the attachment of other structural components to the selected structural component.

The present invention also includes a connection structure for structurally attaching a first structural component to a second structural component, which includes a segment of chord forming a permanent integral element of one of the first and second structural components and a segment of forming strip forming a permanent integral element of the other of the first and second structural components.

A segment of chord in turn includes a generally elongated main body having generally square cross section defined by four main walls surrounding a central bore and having four interior main surfaces and four exterior main surfaces and a T-slot structure extending along and centered on each exterior main surface, each T-slot structure having an interior T-slot adapted to accept a bolt type fastener, each T-slot including a shaft slot extending inwards from an outer surface of the T-slot structure and connecting with a cross slot extending at a right angle to the shaft slot at an inner end of shaft slot. A mating segment of forming strip then includes a single generally elongated strip plate formed into a plurality of strip segments, each strip segment being oriented at a right angle with respect to an adjacent strip segment and the strip segments being formed into regions including, in succession, a corner region forming a w-shaped cross section forming bearing surfaces mating with corresponding chord bearing surfaces formed by two adjacent main walls and an adjacent side wall of T-slot structure, a face region forming a bearing surface mating with chord bearing surfaces formed by outer face surfaces of the T-slot structure, and an attachment region extending outwards from an edge of the face region for stiffening of the forming strip.

There is at least one bolt hole located in the face region of the forming strip for accepting a bolt type fastener for attachment of the forming strip to the chord by means wherein the bolt type fastener includes at least one of a T-bolt mating with a T-slot structure of the chord and of a hex-bolt mating with a bolt hole extending traversely through the chord wherein the at least one bolt hole extends through the shaft slots and cross slots of opposing T-slot structures of the chord.

BRIEF DESCRIPTION OF THE DRAWINGS

The invention will now be described, by way of example, with reference to the accompanying drawings in which:

FIG. 2A is a side and a cross sectional view of a chord of the present invention;

FIG. 2B is a side and a cross sectional view of a forming strip of the present invention;

FIGS. 2C, 2D 2E and 2F are diagrammatic illustrations of purlin structural components;

FIGS. 2W, 2X and 2Y are diagrammatic illustrations of base plates, wheel components and wheel frames;

FIG. 4B is a diagrammatic side view of a curbing component;

FIG. 4C is a face view of a mounting plate of a curbing component; and

DETAILED DESCRIPTION OF THE INVENTION

Figure 1A:
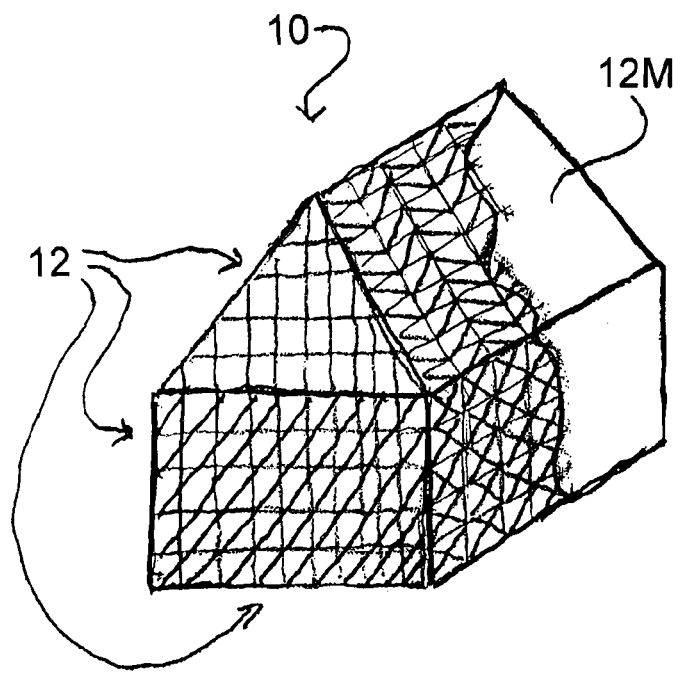
FIGS. 1A and 1B are illustrative diagrammatic representations of structures constructed with the modular structural components and connection structures of the present invention.
Figure 1B:
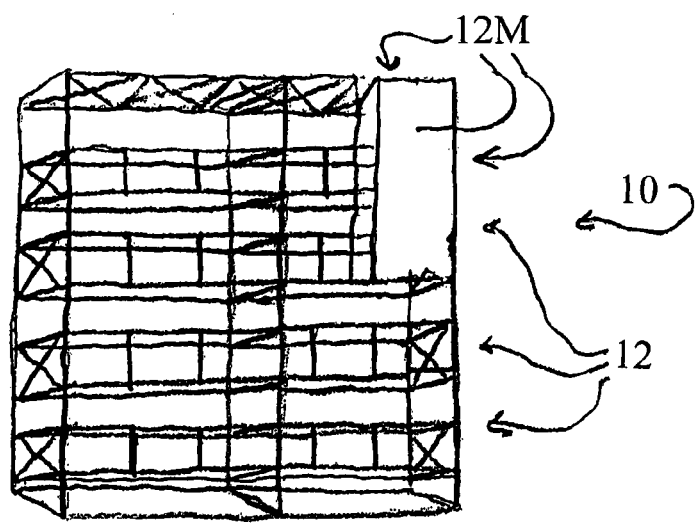

As described herein above, the present invention is directed to a method and apparatus for a system of modular common components for constructing temporary structures that are capable of rapid deployment or construction for a wide range of purposes and that are capable of subsequent rapid modification, disassembly or removal. For example, typical examples of such structures may include scaffolding structures, protective or containment enclosures with work spaces and accesses that enclose, for example, a storage tank or building, and protective or containment enclosure with work spaces and access supported by the structure it is enclosing, such as a bridge. Illustrative examples of such Structures 10, including Enclosures 10A and Scaffolding 10B, are shown in FIGS. 1A and 1B. It will be appreciated, however, that such structures represent only a limited part of the range of various types of structures that may be constructed according to the present invention.

FIGS. 2A-2Y, in turn, are diagrammatic illustrations of many of the Components 12 of the system of the present invention of modular common components for constructing temporary structures; that is, the modular parts from which a Structure 10 may be constructed according to the present invention. As will be seen in FIGS. 1A, 1B and 2, the Components 12 of the present invention form a complete set of different types of modular and reusable Components 12 necessary to construct virtually any desired Structure 10, although it will be appreciated that the selection of Components 12 for a given circumstance will vary, depending on the requirements. As illustrated in FIGS. 2A-2Y, the selection of Components 12 typically include a number of basic, fundamental structural Components 12 that are typically common to almost all Structures 10, together with certain special or limited purpose Components 12 as required for a particular situation.

It should also be noted that certain of the Components 12 described herein below are described as being of various standard lengths, which are selected to provide the maximum flexibility in constructing Structures 10 while requiring the minimum number of different lengths necessary to achieve the maximum modularity in both the Components 12 and the Structures 10. In a present embodiment of the invention, for example, the lengths of Components 12 may vary between 3 and 12 feet and will include, for example, intermediate modular lengths of 4, 6 and 9 feet.

A. Modular Common Components 12 for Temporary Structures

According to the present invention, and as will be discussed in detail in the following, the Components 12 are, in turn, comprised of one or more of a limited number of different types of Structural Elements 12E having shapes and functions as defined according to the present invention. As will be described, Structural Elements 12E will generally include Main Elements 14, Connection Elements 16 and Reinforcing Elements 18 wherein one or more Main Elements 14 comprise the main structural members of a Component 12 and may be comprised of structural members referred to as Chords 14C and Forming Strips 14F. Connection Elements 16 in turn comprise the means by which Components 12 are connected together to form a Structure 10 and are typically formed of Forming Strips 14F or Stubs 16S. Reinforcing Elements 18, in turn, are are structural members permanently connected between, for example, the Main Elements 14 of a Component 12, to provide additional strength or form to the basic structure of the Component 12 and are typically formed, for example, of sections of pipe or other tubular elements, referred to as Reinforcements 18R, or flat metal plates, referred to as Gussets 18G. Also includes among Structural Elements 12E are Membranes 14M, which may be extended over exterior or interior portions of a Structure 10 to enclose and separate at least a part of the interior volume of the Structure 10 from the exterior environment. As described, Membranes 14M may be used to protect the contents of a Structure 10 from the exterior environment, such as rain, snow, sleet, winds and dust, or to protect the exterior environment from the interior environment of the Structure 10, such as paint and rust removed by sandblasting, toxic or contaminating chemicals, and so on.

Next referring to certain of the varieties of Components 12 individually, as shown in FIG. 2A a Chord 14C is an elongated member having a variable length and the Chord 14C cross section illustrated in FIG. 2A while a Forming Strip 14F is an elongated member of variable length having the Forming Strip 16FS cross section illustrated in FIG. 2B. It will be understood after the following discussions, however, that Components 12 may include yet other standard structural shapes where such other elements would be more suitable for the intended purpose.

In the method and apparatus of the present invention, a typical set of Components 12 will include those Components 12 most commonly used in a typical Structure 10. Such Components 12 will typically include Straight Chords 20 of various lengths, as shown in FIG. 2A, wherein a Straight Cord 20 has a single Main Element 14, which is a single Chord 14C that is usually positioned vertically and that has a number of Bolt Holes 14B extending through the diameter of the Chord 14C near the ends to engage with one or more Connecting Elements 16. A Straight Chord 20 will also typically include Bolt Holes 14B located along the length of the Chord 14C at standard distances or intervals to enable connections to other Components 12.

Components 12 may also include various forms of Purlins 22 wherein a Purlin 22 is a generally horizontally positioned beam-like structure. In this regard, it should be noted that the term "purlin" once meant as a specific type of horizontal structural member, but that the term "purlin" has, in more recent common usage, assumed a general meaning as any type of horizontal structural member.

Figure 2E:
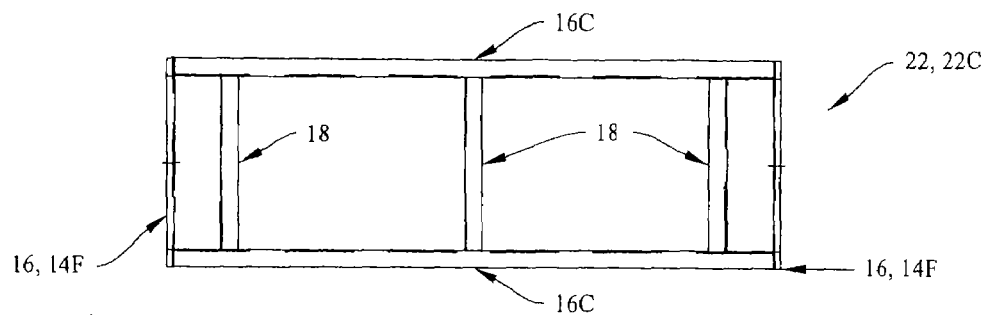

As shown in FIGS. 2C, 2D, 2E and 2F, the various types of Purlins 22 typically include Single Purlins 22A, as shown in FIG. 2C, which are each comprised of a single horizontally positioned Main Element 14 comprised of a single Chord 14C of standard length with a Connection Element 16 located at each end of the Chord 14C. In a typical Single Purlin 22A, the Connection Elements 16 are comprised of sections of Forming Strips 14F attached transversely to the ends of the Single Purlin 22A, and the Main Element 14 may in certain alternate embodiments be comprised of a Forming Strip 14F of the desired length rather than of a Chord 14C.

Standard Purlins 22B of various lengths are, as shown in FIG. 2D, comprised of upper and lower horizontal Main Elements 14 with generally vertical Reinforcing Elements 18 running between the horizontal Main Elements 14 and a Connection Element 16 at each end of each of the Main Elements 14. In a typical implementation of a Standard Purlin 22B, the horizontal Main Elements 14 may be comprised of Forming Strips 14F or Chords 14C, the Reinforcing Elements 18 are typically formed of piping of an appropriate diameter and wall thickness, and the Connection Elements 16 are each comprised of a vertical section of Forming Strip 14F extending between the upper and lower horizontal Main Elements 14.

Platform Deck Purlins 22C, shown in FIG. 2E, are intended for use as the supporting structures for horizontal platforms or decks, such as may be used to form work platforms, a floor between levels of a Structure 10, a runway for a moveable structure, such as a cover, and so on. A Platform Deck Purlin 22C is thereby comprised of a parallel pair of horizontally positioned and horizontally spaced apart Main Elements 14 that are typically comprised of Chords 14C but that may be comprised of Forming Strips 14F, and that are connected by Reinforcing Elements 18 formed of Forming Strips 14F extending horizontally between and a right angles to the Main Elements 14. A Connection Element 16 comprised of a Forming Strip 14F extending between and attached to the Main Elements 14 is located at each end of the Platform Deck Purlin 22C, so that the Platform Deck Purlins 22C may be connected to, for example, horizontally positioned Standard Purlins 22B. Decking or platform components may then be laid upon or attached to the top surface of one or more adjacent Platform Deck Purlins 22C to form, for example, a work platform or a floor between levels of a Structure 10.

Figure 2F:
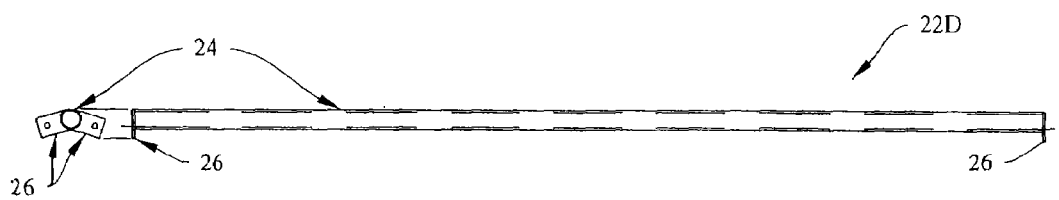

Finally, Purlins 22 may include Ridge Purlins 22D which, as shown in FIG. 2F, are configured to form a roof ridge for roofs having various degrees of slant and various lengths. Ridge Purlins 22D are of one or more standard lengths and are each comprised of a Ridge Pivot 24 having two Rotating Attachment Plates 26 rotatably attached to each end to allow the attachment of roof elements to the Ridge Pivot 24 at the desired or necessary slant angle. Ridge Purlins 22D are unlike most of the other Purlins 22, being designed for a specific purpose as a roof ridge element for variable slant roofs rather than as a general use element, although Ridge Purlins 22D may be used for other purposes, such as providing a rotating connection. Ridge Pivots 24 may be comprised, for example, of piping of a suitable diameter and wall thickness, while Rotating Attachment Plates 26 are simple plates rotatably attached to the ends of Ridge Pivots 24 and with Bolt Holes 14B for the attachment of the roof members.

Figure 2G:
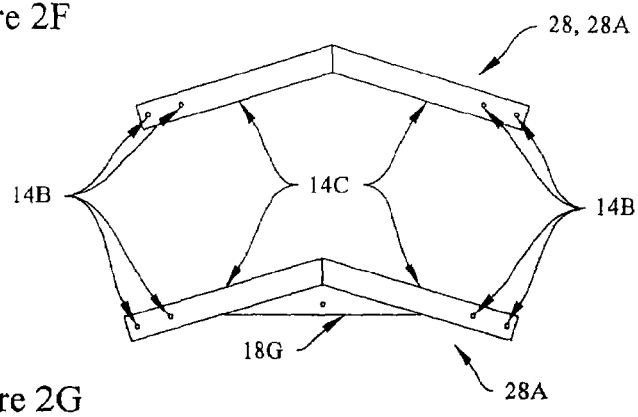
FIGS. 2G and 2H are diagrammatic illustrations of roofing structural components.
Figure 2H:
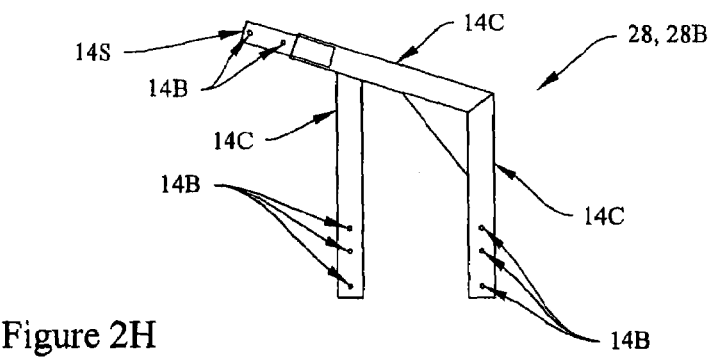

Related roofing Components 12 include Roofing Components 28, which may include Ridge Chords 28A and Double Eave Sections 28B, shown in FIGS. 2G and 2H, which are respectively used to form a roof peak at a fixed slant angle and to form the eaves of a roof. As illustrated, a Ridge Chord 28A is comprised of two Main Elements 14 comprised of Chord 14C sections attached at a desired angle and may be constructed with or without a reinforcing Gusset 18G in the interior angle between the two Chord 14C sections. A Double Eave Section 28B, in turn, is comprised of Main Elements 14 comprised of Chord 14C sections arranged as shown in FIG. 2H and may or may not include reinforcing gussets in the interior angles between the Chord 14C sections.

Figure 2I:
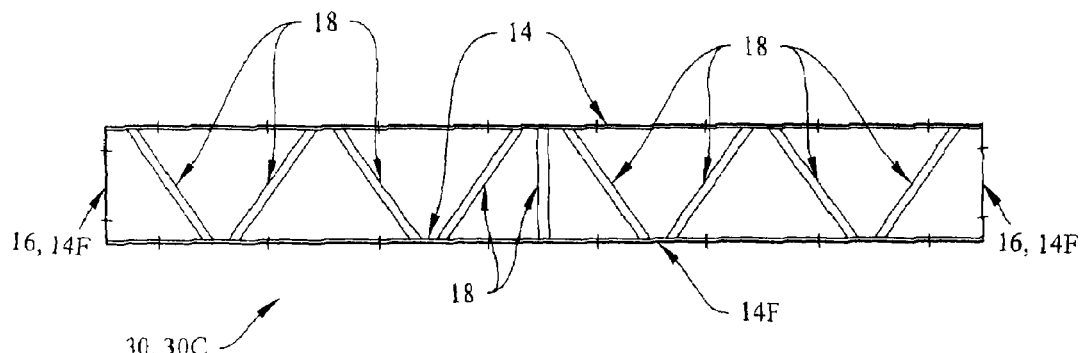
FIGS. 2I, 2J and 2K are diagrammatic illustrations of lattice truss structural components.

Other Components 12 include, for example, various Lattice Trusses 30 and Braces 32 wherein Lattice Trusses 30 are in many respects similar to Purlins 22 but which are designed primarily as a structural strengthening component rather than as a connecting or attachment element. As such, one of the primary differences between Lattice Trusses 30 and Purlins 22 is that, in accordance with their intended function, the Reinforcements 18R are positioned at an angle to the Main Elements 14 rather than perpendicular to the Main Elements 16. As illustrated in FIGS. 2G, 2H and 2I, Small Ridge Lattices 30A, Small Eave Lattices 30B and Lattice Trusses 30C are generally comprised of two vertically spaced apart, parallel, horizontal Main Elements 14 interconnected by a number of Reinforcements 18R extending at an angle between the Main Elements 14 and having Connection Elements 16 extending vertically between the Main Elements 14 at the ends of the Main Elements 14.

Figure 2J:
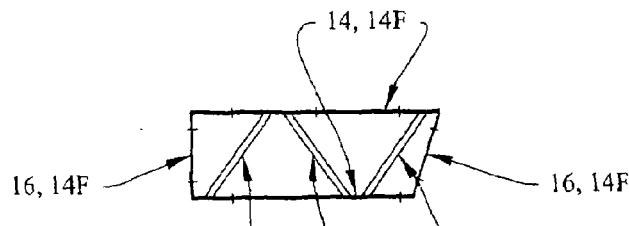
Figure 2K:
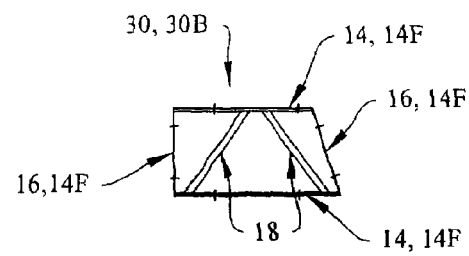

As may be seen from FIGS. 2I, 2J and 2K, the primary differences between the various forms of Lattice Trusses 30 are in the dimensions and outline forms of the Lattice Trusses 30, with, for example, a Lattice Truss 30C forming an elongated rectangle while Small Ridge Lattices 30A and Small Eve Lattices 30B and proportionally shorter in the horizontal direction and have one end at an angle with respect to the overall rectangular shape of the lattice. In general, the Main Elements 14 of Lattice Trusses 30 may be comprised of Forming Strips 14F, while Connection Elements 16 are normally comprised of sections of Forming Strips 14F and the Reinforcing Elements 18 are most typically comprised of piping Reinforcements 18R of an appropriate diameter and wall thickness.

Figure 2L:
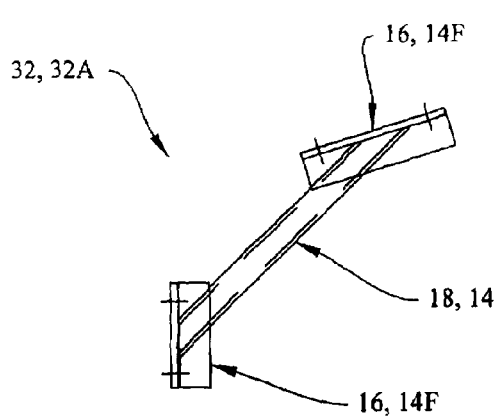
FIGS. 2L, 2M and 2N are diagrammatic illustrations of brace structural components.
Figure 2M:
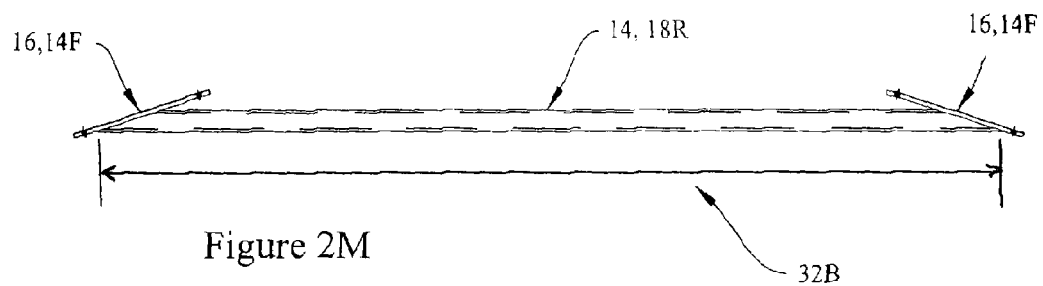
Figure 2N:
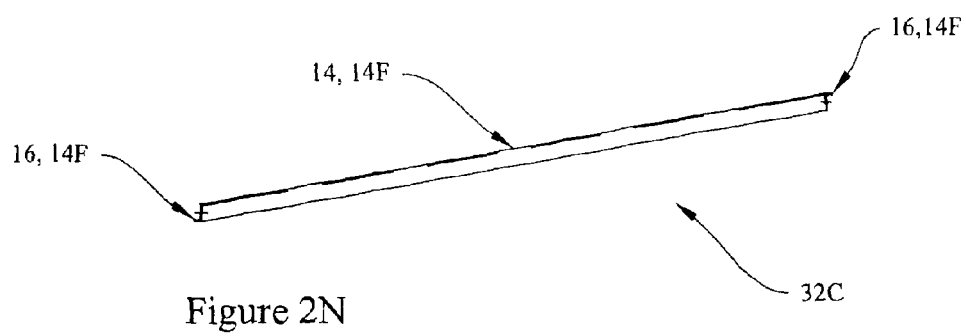

Braces 32, shown in FIGS. 2L, 2M and 2N, may include Knee Braces 32A, Cross-Tie Braces 32B and Diagonal Braces 32C, each of which is comprised of a Main Element 14 running at an angle between two other structural Components 12 as a Reinforcement 18, such as between a Purlin 22 and a Straight Cord 20. Each Brace 32 also includes a Connection Element 16 mounted at each end of and at an angle to the longitudinal axis of the Main Element 14 to form a mating connection with the Components 12 supported by the Brace 32. The Main Elements 14 of Braces 32 are typically comprised of sections of Chords 14C, Forming Strips 14F or Reinforcements 18 and the Connection Elements 18 are typically comprised of sections of Forming Strip 14F.

Figure 2O:
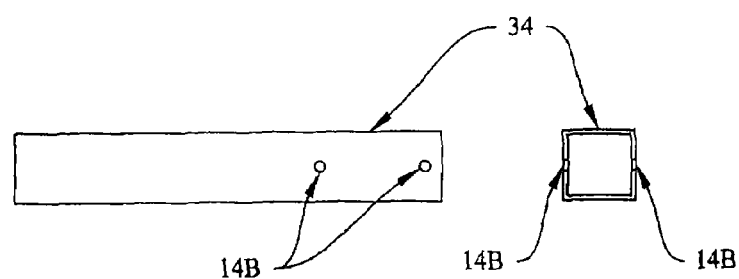
FIG. 2O is a diagrammatic illustration of a stub structural component.
Figure 2P:
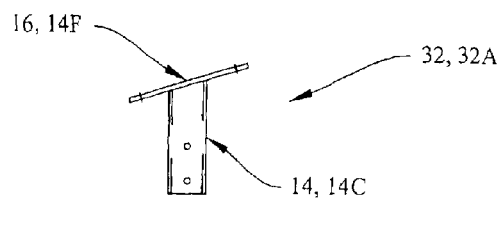
FIGS. 2P, 2Q, 2R, 2S, 2T, 2U and 2V are diagrammatic illustrations of bracket structural components.
Figure 2Q:
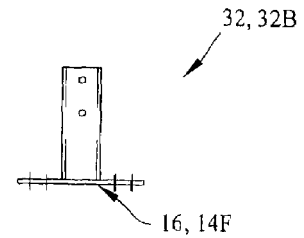
Figure 2R:
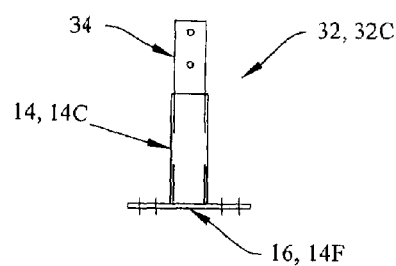
Figure 2S:
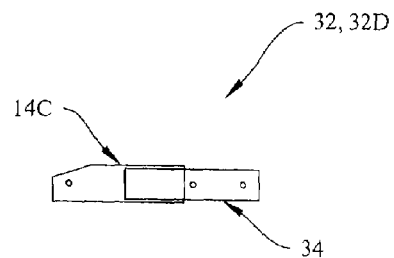
Figure 2T:
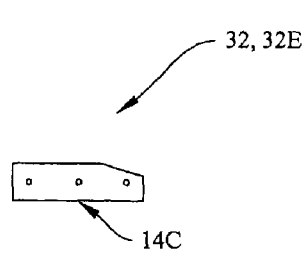
Figure 2U:
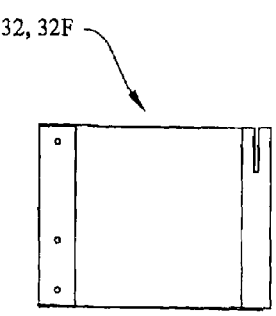

Yet other Components 12, illustrated in FIGS. 2P and 2O, include Stubs 34 and Brackets 32 wherein Stubs 34 provide axial connections between, for example, two Straight Chords 20 or between a Straight Chord 20 and a Bracket 32 or between two Chord 14C elements. A Stub 34 is comprised of a length of square cross section tubing dimensioned to slidingly fit within the square cross section longitudinal opening in a section of a Chord 14C, as illustrated, for example, in the following FIGS. 3A-3E. A Stub 34 is also typically provided with two transverse openings, identified as Bolt Holes 14B, located in one half of the length of the Stub 30 and corresponding to Bolt Holes 14B through a section of Chord 14C to affix the Stub 30 into a mating engagement with the section of Chord 14C by means of, for example, a T-bolt or a standard hex bolt passing through the transverse openings, as also further illustrated in the following FIGS. 3A-3E as well as in FIGS. 2A-2Y.

As indicated in FIGS. 2P-2W, Brackets 32 may include Drop Brackets 32A, Male and Female Stub Brackets 32B and 32C, Male and Female Brackets 32D and 32E, Ridge Drop Brackets 32F, Bottom Truss Brackets 32G and Single Base Plates 32H, all of which are designed to facilitate an attachment of one Component 12 to another by means of a Stub 30. As illustrated, each Bracket 32 includes at least one Main Element 14 comprised of a section of a Chord 14C and one or more Connection Elements 16 for attachment of the Bracket 32 to another Component 12 wherein each Connection Element 16 may be comprised, for example, of a section of a Forming Strip 14F or of a flat plate welded to a Main Element 14 and having Bolt Holes 14B for attachment by means of, for example, T-bolts or standard hex bolts.

As illustrated in FIGS. 2X and 2Y, it will be apparent that yet other Components 12 may comprise Wheel Assemblies 32W and Wheel Frames 32X, which allow the construction of moving structures and platforms when, for example, it is necessary or desired to construct a work platform that can be moved over the ground or another foundation or platform of over an open or otherwise unsupported or unsupporting space. Wheel Brackets 32I have one end configured for the attachment of a Wheel Assembly 38 and one or more opposing ends configured to accept corresponding Stubs 30 to allow attachment of the Wheel Bracket 32I to another Component 12.

B. Primary Structural Elements 12E—Chords 14C, Forming Strips 14F and Stubs 34

Referring again to FIGS. 2A-2Y will be apparent from the above descriptions of the Components 12 of the system of modular common components for constructing temporary structures of the present invention that Components 12 and the sub-components of Components 12 are essentially comprised of certain primary Structural Elements 12E, together with certain common elements, such as tubing for reinforcing elements, and a few relative rare elements, such as wheel assemblies. As described, the primary Structural Elements 12E include Chords 14C of various lengths, Forming Strips 14F of various lengths, Connection Elements 16 and Stubs 34.

Figure 3A:
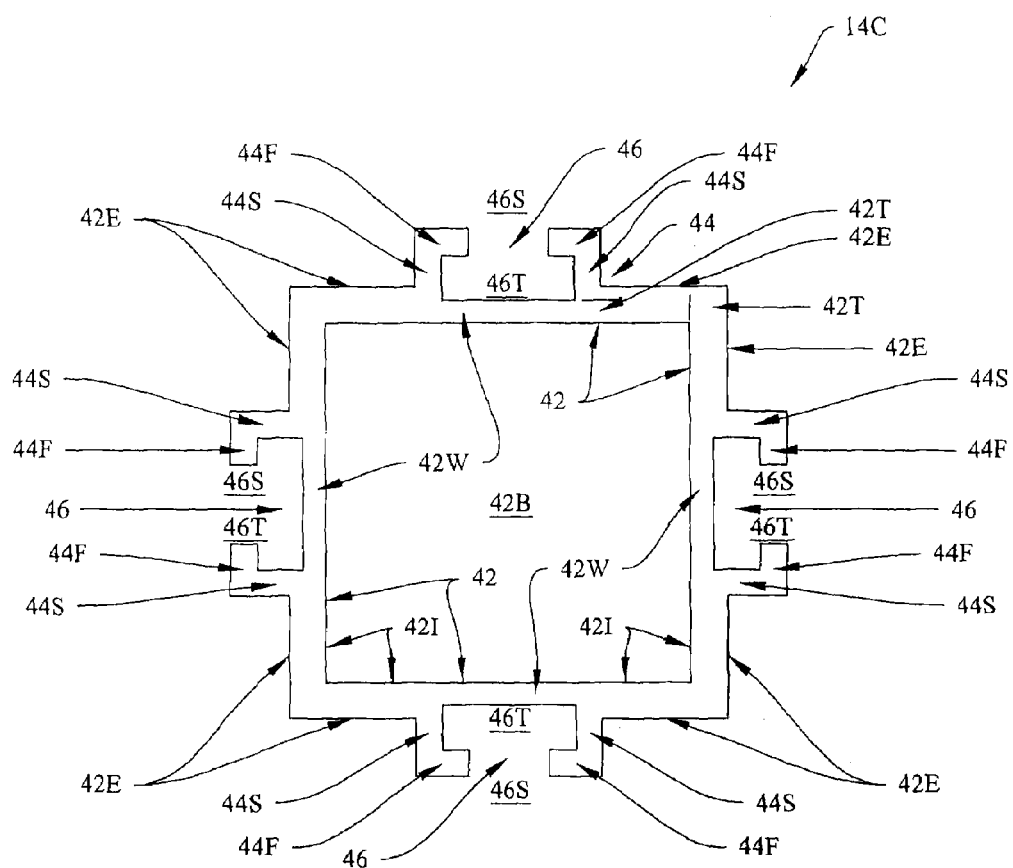
FIGS. 3A and 3B are cross section views of a chord of the present invention.
Figure 2V:
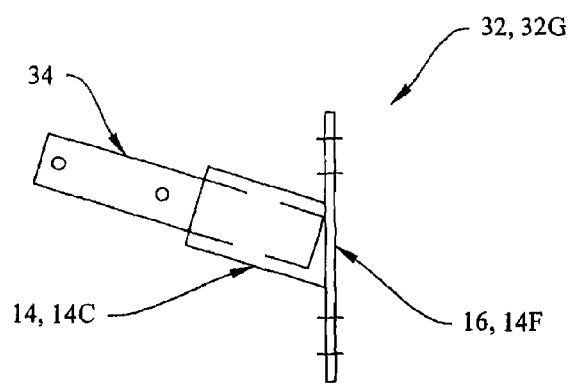
Figure 3B:
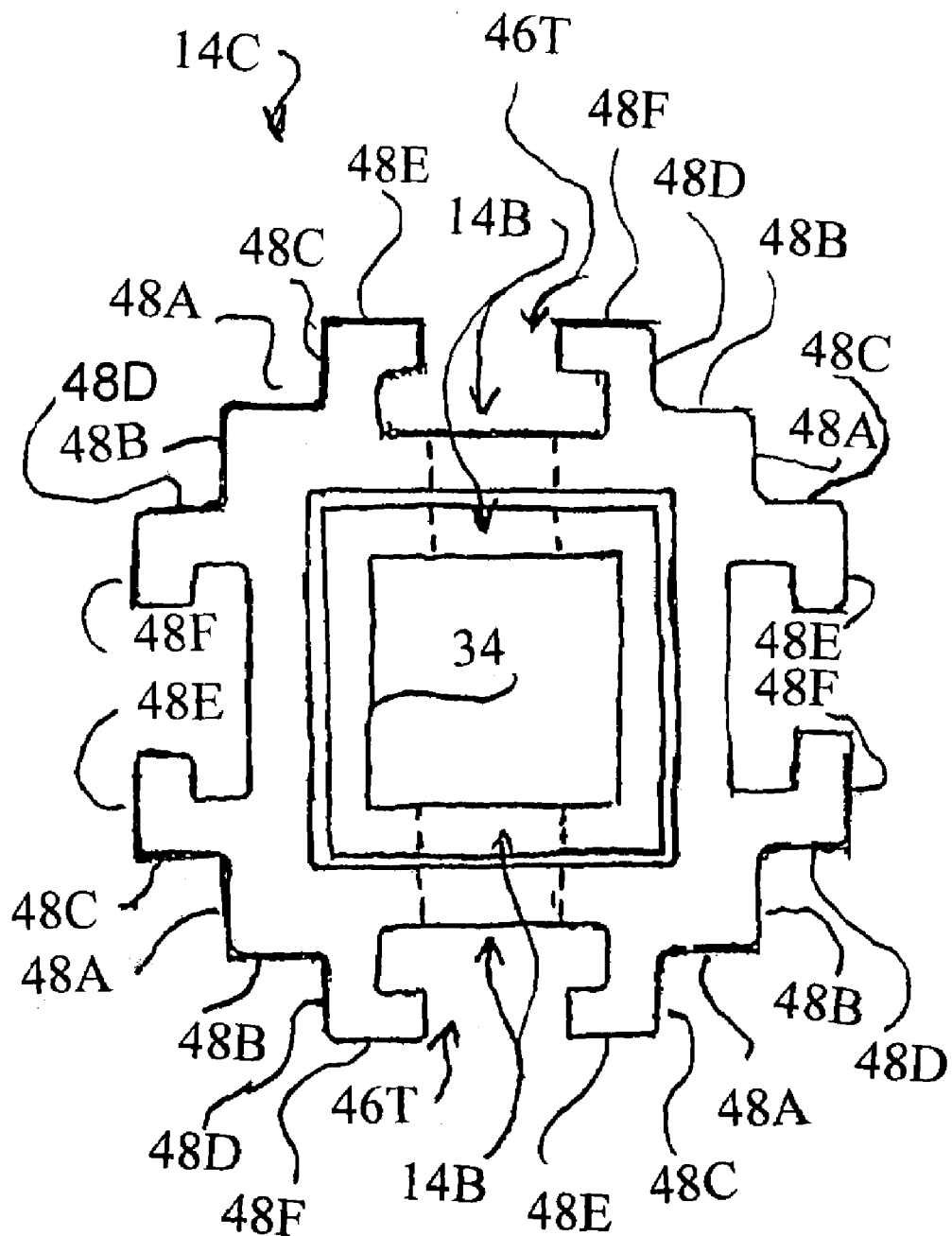
Figure 3C:
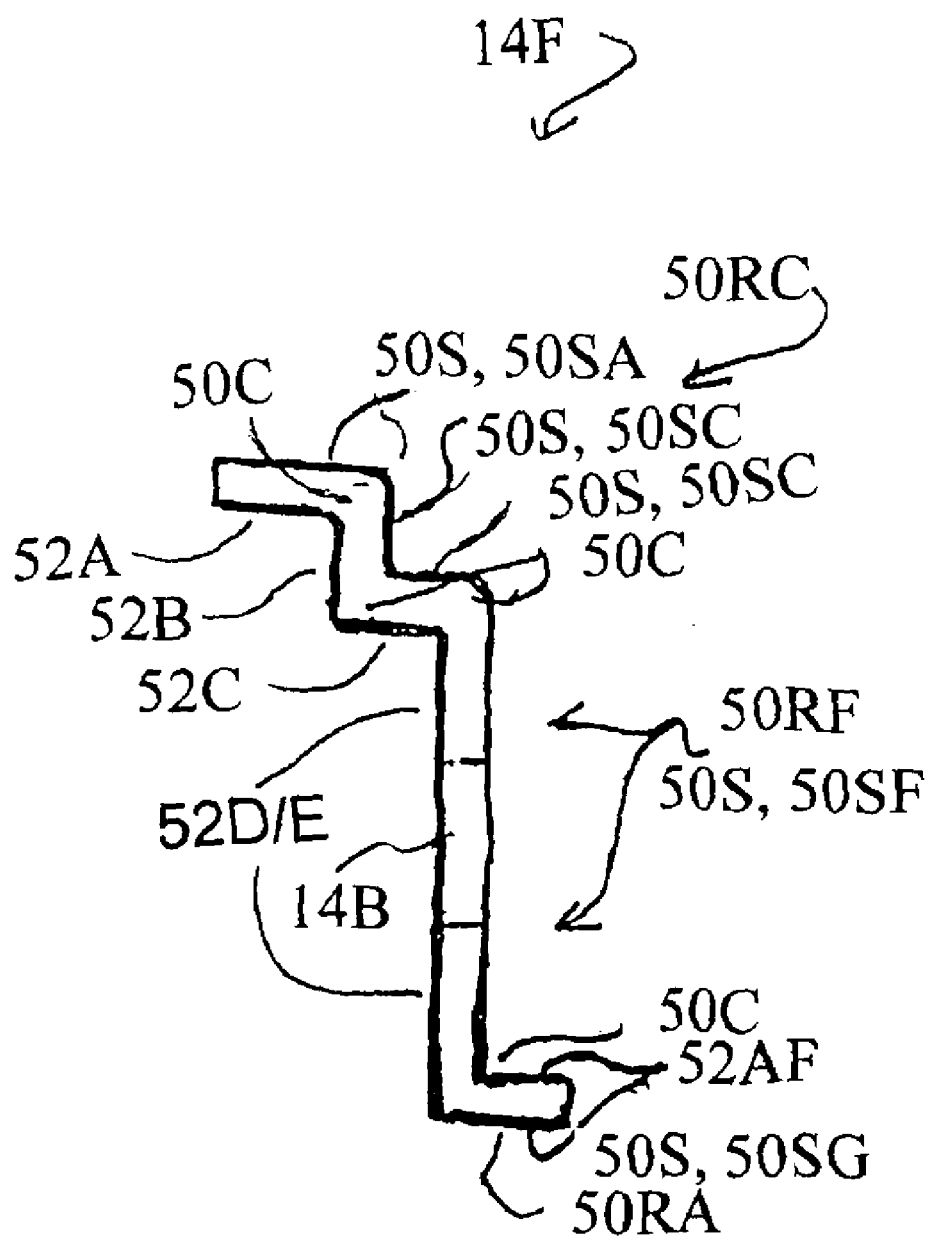
FIG. 3C is a cross section view of a forming strip of the present invention.
Figure 3D:
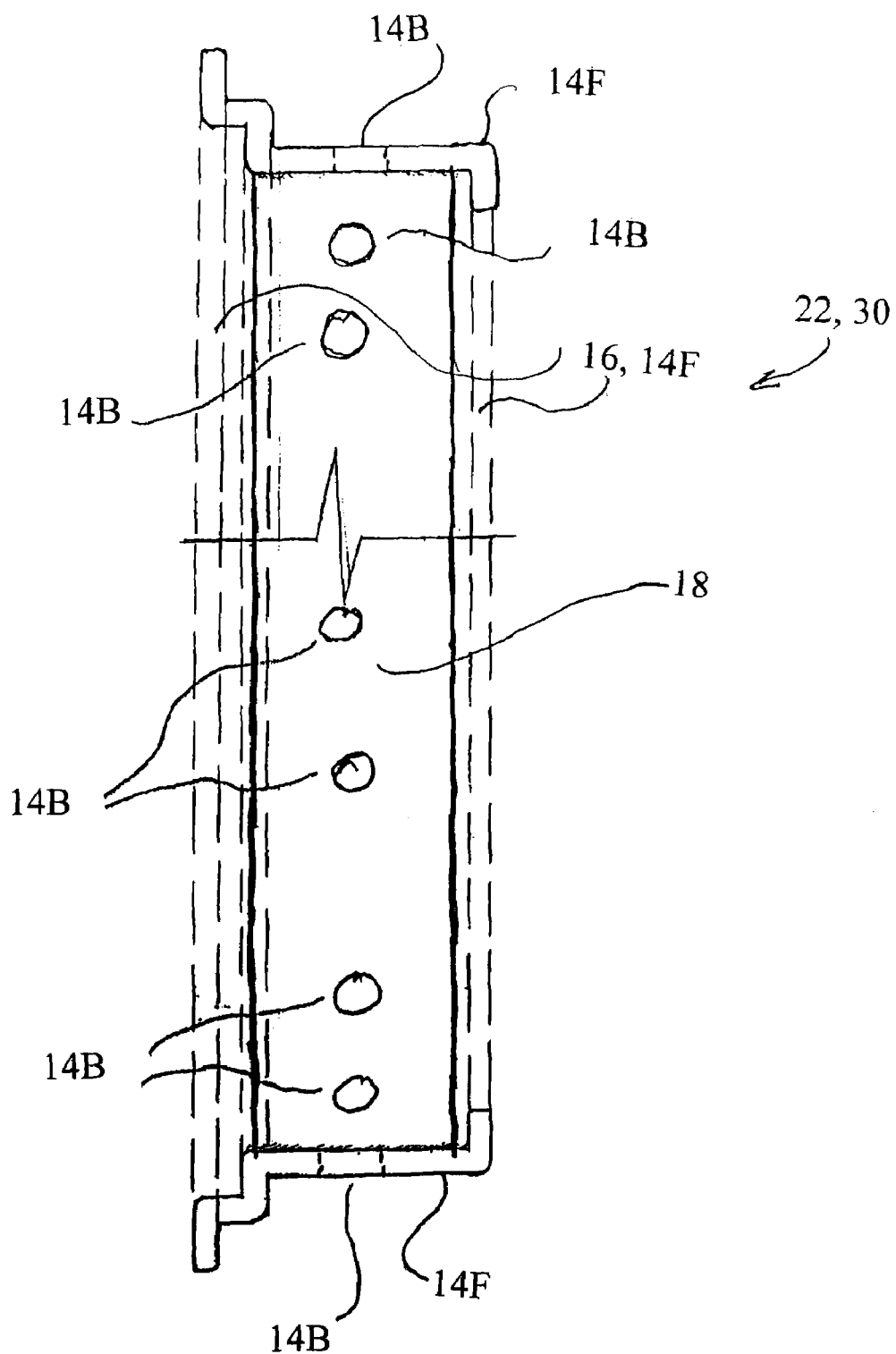
FIG. 3D is a cross section view of a structural component have a forming strip of the present invention.
Figure 3E:
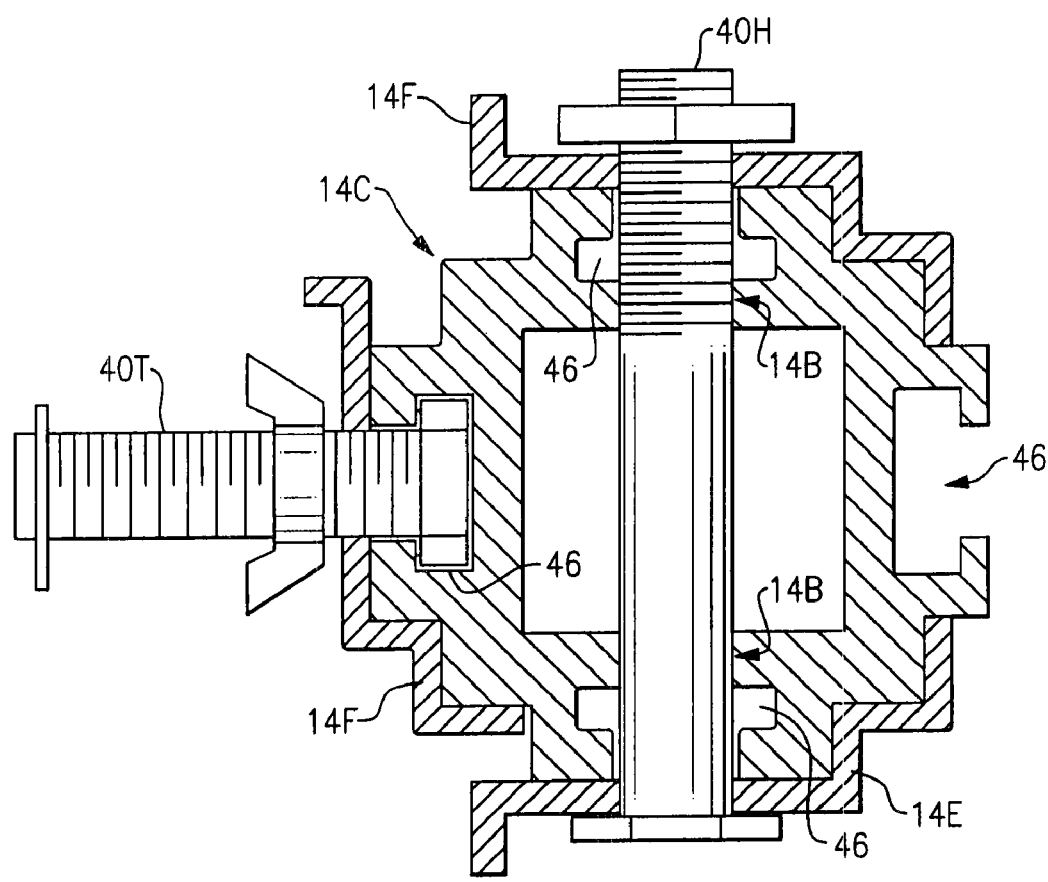
FIG. 3E is a cross section view of several forming strips mating with a chord and bolts fastening forming strips to the chord.

Cross sectional views of Chords 14C, Forming Strips 14F and Stubs 30 are illustrated and discussed with respect to FIGS. 3A-3E wherein FIG. 3A is a cross sectional view of a Chord 14C, FIG. 3B is a cross sectional view of a Chord 14C with a Stub 34 inserted therein and with Bolt Holes 14B, FIG. 3C is a cross sectional view of a Forming Strip 14F, FIG. 3D is a cross sectional view of, for example, a Purlin 22, a Lattice Truss 30 or a Brace 32, and FIG. 3E is a cross sectional view of a Chord 14 with multiple Forming Strips 14F mated thereto and secured with a Hex-Bolt 40H and a T-Bolt 40T. The following descriptions will refer to all of FIGS. 3A-3E concurrently as certain aspects and elements of the present invention will be shown in one of FIGS. 3A-3E and not another solely for clarity of illustration, presentation and understanding and to avoid the complexity and crowding arising from the showing of all features in each individual figure. It must be understood, however, that the showing of one feature or aspect of the present invention in one of FIGS. 3A-3E and not another is not intended to be limiting and should not be taken to be limiting and that any given feature or aspect of the invention may otherwise appear in any or all of FIGS. 3A-3E and in any combination.

As illustrated in FIG. 3A, the Main Body 42 of a Chord 14C is defined by four Main Walls 42W surrounding a generally square central opening, identified as Bore 42B, forming a generally square cross section, having four Interior Main Surfaces 42I and four Exterior Main Surfaces 42E extending the length of the Chord 14C, the Interior Surfaces 42I and Exterior Surfaces 42E being spaced apart by the Wall Thickness 42T of Main Walls 42W.

The Exterior Main Surface 42E of each Main Wall 42W further includes a T-Slot Structure 44 extending along the length of the Chord 14C and centered on the Exterior Main Surface 42E. Each T-Slot Structure 44 is formed by two parallel Slot Side Walls 44S extending outwardly in parallel from the Exterior Main Surface 44E and along the axis of the Exterior Main Surface 44E and two Slot Face Walls 44F extending inwardly towards each other from the tops of Slot Side Walls 44S and parallel to Exterior Main Surfaces 44E.

The structural elements of each T-Slot Structure 44 thereby form an interior T-Slot 46 opening extending along the length of the T-Slot Structure 44, that is, the length of the Chord 14C.

Each T-Slot 46 has a T-shaped cross section that includes a Shaft T-Slot 46S portion extending perpendicularly from the outer surface of the T-Slot Structure 44 and inwardly towards Bore 42B of Main Body 42 and a Cross T-Slot 46C extending at right angles to either side of Shaft T-Slot 46S at the inner end of Shaft T-Slot 46S and terminating Shaft R-Slot 46C.

The dimensions and shape of a T-Slot Structure 44 and the interior dimensions and shape of a T-Slot 46 are determined so that a T-Slot 46 will accept either a conventional Hex Bolt 40H or a T-Bolt 40T, with the head of the Hex-Bolt 40H or the head of the T-Bolt 40R being accepted into and fitting within the Cross T-Slot 46C. The shape and dimensions of T-Slot 46 are specifically designed for use with Hex Bolts 40H, which as well known and as indicated by phantom lines in, for example, FIG. 3E, has a rectangular head wherein the head is generally slightly longer than the width of Cross T-Slot 46C and approximately as wide as the width of Shaft T-Slot 46S. The shape and dimensions of the head of a T-Bolt 40T are thereby such that the head of a T-Bolt 40T may pass through Shaft T-Slot 46S and into Cross T-Slot 46C when the long axis of the rectangular T-Bolt 40T head is aligned along the longitudinal axis T-Slot 46. The T-Bolt 40T may then be rotated about the axis of the shaft of the T-Bolt 40T until the head of the T-Bolt 40T is transverse to the longitudinal axis of the T-Slot 46. At this point, the T-Bolt 40T cannot be withdrawn from the T-slot 46 as the length of the T-Bolt 40T head in this orientation is greater than the width of the Shaft T-Slot 46S. In addition, the T-Bolt 40T can be rotated to form an interference fit with the walls of Cross T-Slot 46C, thereby preventing movement of the T-Bolt 40T along the T-Slot 46 or at any angle to T-Slot 46. The T-Bolt 40T can be removed only by rotating the T-Bolt 40T until the long axis of the T-Bolt 40T head is aligned with the longitudinal axis of the T-Slot 46.

T-Slots 46 may also accept standard Hex-Bolts 40H but the shape and dimensions of the head of a Hex-Bolt 40H will generally prevent the insertion or removal of the head of the Hex-Bolt 40H through Shaft T-Bolt 46S at any point along the length of the T-Slot 46, and will generally require that the Hex-Bolt 40H be inserted or removed at one end of the T-Slot 46 and moved along the T-Slot 46 to the desired location. It will also be recognized that the shape of the head of a Hex-Bolt 40H will generally not permit effective use of the rotating cam locking action, as with a T-Bolt 40T, unless the head of the Hex-Bolt 40H is specially adapted for this purpose.

Further in this regard and as also illustrated in FIGS. 3A-3E and as has been discussed, Chords 14C, Forming Strips 14F and Stubs 14S include Bolt Holes 14B located along their lengths to allow the Components 12 to be attached to one another by, for example, Hex-Bolts 40H. The arrangement of Bolt Holes 14B in a Structural Element 12E, such as a Chord 14C, a Forming Strip 14F or a Stub 14S, usually takes the form of a pair Bolt Holes 14B at or near each end of the Structural Element 12E, with the two Bolt Holes 14B being arranged in series along the Structural Element 12E and spaced a first standardized distance apart. Other single Bolt Holes 14B may also be spaced along the Structural Element 12E, and will typically be spaced a second standard distance apart where the second standard distance is typically larger than the first standard distance.

The Bolt Holes 14B in a Chord 14C for T-Bolts 40T are illustrated generally in FIGS. 3E and 3B, wherein a Bolt Hole 14B is shown as extending transversely through the width of the Chord 14C. As indicated, the Bolt Hole 14B is comprised of the passage formed by the Shaft T-Slots 46T located on opposing sides of the Chord 14C and two matching Holes 14H formed in Main Walls 42W, which thereby connect the two Shaft T-Slot 46T through the Main Body 42 of the Chord 14C to form the single Bolt Hole 14B passage. As indicated, the Head 40HH of the Hex-Bolt 40H, and often a washer of some form, will thereby bear against the outer surface of the Slot Face Walls 44F of one of the T-Slot Structures 44 while the hex nut, and again possibly a washer, will bear against the outer surface of the Slot Face Walls 44F of the opposing T-Slot Structure 44.

As further illustrated in FIG. 3B, a Stub 34 may be inserted into the central Bore 42B of a Chord 14C with Bolt Holes 14B in opposite faces of the Stub 34 corresponding to and being aligned with corresponding passages on opposite sides of the Chord 14C. As shown, the passage on each side of Chord 14C is comprised of a Bolt Hole 14B in a Main Wall 42W of the Chord 14C in alignment with the Shaft T-Slot 46S of the corresponding T-Slot Structure 44, thereby allowing a Hex-Bolt 40H to be secured through the Chord 14C and Stub 34. As described previously, Stubs 34 thereby allow Chords 14C to be connected lengthwise to yet other Components 12, such as another Chord 14C or a wheel assembly.

C. Mating of a Forming Strip 14F to a Chord 14C

Next considering the mating of a Chord 14C with a Forming Strip 14F, such as a Connection Element 16, and as illustrated in particular in FIG. 3E and in FIGS. 3B and 3C considered jointly, it will be apparent that the cross section forms of a Chord 14C and of a Forming Strip 14F result in a plurality of bearing surfaces to support compressive, tensional and torsional forces resulting from the assembly of Components 12 into a Structure 10.

First considering Chords 14C, for example, each Exterior Main Surface 44E of a Chord 14C provides two Chord Bearing Surfaces 48, indicated as Main Body Bearing Surfaces 48A and 48B, wherein each of Main Body Bearing Surfaces 48A and 48B is located between a exterior side of a Slot Side Wall 44S and the outer edge of the adjacent Exterior Main Surface 44E and extends the length of the Exterior Main Surface 44E. The Slot Side Walls 44S and Slot Face Walls 44F of each T-Slot Structure 44 form Side Wall Bearing Surfaces 48C and 48D and Face Wall Bearing Surfaces 48E and 48F for each Exterior Main Surface 44E. As indicated, Side Wall Bearing Surfaces 48C and 48D and Face Wall Bearing Surfaces 48E and 48F are formed by the exterior surfaces of Slot Side Face Surfaces 44S and Slot Outer Face Surfaces 440.

Lastly with respect to Chords 14C, it must be noted that the inner surfaces of each T-Slot 46, that is, the inner faces of Slot Side Walls 44S and Slot Face Walls 44F, form further Bolt Bearing Surfaces 48G and 48H to support the compressive forces resulting from tensional and torsional forces imposed through T-Bolts 40T. In this regard, it must also be noted that the plane defined by the inner face of each Cross T-Slot 46C, that is, the face parallel and adjacent to the corresponding Interior Main Surface 42I of the Main Wall 42W of the Chord 14C, is not co-planar with the corresponding Exterior Main surface 42E of the Main Wall 42W. Instead, the plane defined by the inner face of each Cross T-Slot 46C is offset inwardly towards the central axis of the Chord 14C with respect to the Exterior Main Surface 42E, thereby effectively being within the thickness of the Main Wall 42W. As may be seen from examination of FIGS. 3A-3E, not only are the planes of the inner face of each Cross T-Slot 46C and the corresponding Exterior Main surface 42E of the Main Wall 42W not co-planar, but the wall thickness through the diagonal shortest path between these planes, that is, between the adjacent corners terminating these planes, is maximized so that the geometry of these elements provides increased strength at a potential point of maximum stress.

Referring now to Forming Strips 14F as illustrated in cross sectional view in FIGS. 3C, 3D and 3E, each Forming Strip 14F is comprised of a single Strip Plate 50P having a standard width and a variable length that is typically greater than its width and that may range from the entire length of a Purlin 22, for example, to the length necessary to form an attachment between, for example, a Purlin 22 or Truss 30 and a Chord 14C. As illustrated in the cross sectional views of a Forming Strip 14F, the cross section of a Forming Strip 14F is comprised of a plurality of Strip Segments 50S running the length of the Forming Strip 14F and forming a succession of faces mating with corresponding faces formed by the cross section of a Chord 14C.

As shown, each Strip Segment 50S in succession across the Strip Plate 50P is perpendicular to the preceding and succeeding Strip Segments 50S, so that successive Strip Segments 50S are joined by right angle corners, identified as Strip Corners 50C. Strip Segments 50S may in turn be viewed as forming three primary regions, indicated in order across the Strip Segments 50S as comprising a Corner Region 50RC, a Face Region 50RF and an Attachment Region 50RA.

As illustrated, Corner Region 50RC is comprised of Strip Segments 50SA, 52SB and 52SC, thereby forming a "zig-zag" or "w shaped" structure mating with a corner formed by the Main Wall 42W of the face of the Chord 14C with which the Forming Strip 14F is mating and an adjacent Main Wall 42W of that Chord 14C. Corner Region 50RC thereby forms Bearing Surfaces 52A, 52B and 52C that respectively mate with corresponding Main Body Bearing Surfaces 48A and 48A and a Wall Bearing Surface 48C of the Chord 14C.

Face Region 50RF is formed of the single Strip Segment 50SF which mates against the two Slot Outer Face Surfaces 440 of the T-Slot Structure 44 of the Main Wall 42W of the face of the Chord 14C with which the Forming Strip 14F is mating. As may be seen, therefore, Face Region 50RF provides a Bearing Surface 52D/E that mates with Face Wall Bearing Surfaces 48E and 48F of the T-Slot Structure 44.

Finally, Attachment Region 50RA is comprised of Strip Segment 50SG, which extends directly outwards from the Chord 14C along one side of the Forming Strip 14F and which does not bear against any surface of the Chord 14C. Instead, Attachment Region 50RA provides a structural element for stiffening and reinforcing the Forming Strip 14F and as a possible attachment point or attachment reinforcement point for other structural elements that are permanently attached to the Forming Strip 14F. For example, Attachment Region 50RA may serve as the attachment point for cross Forming Strips 14F running between longitudinal Forming Strips 14F, for the attachment and bracing of various other reinforcing elements, such as the piping sections of a lattice, or for the attachment of decking plates or grids.

In this regard, FIG. 3D is an exemplary cross sectional view of a Component 12 wherein various elements, such as Reinforcing Elements 18, are connected between two Forming Strips 14F which comprise the main structural elements of the Component 12. Examples of such may include various forms of Purlins 22 and Lattice Trusses 30. As shown therein, the Reinforcing Elements 18 are attached to a Strip Attachment Face 52AF in the Face Region 50RF area of a Forming Strip 14F wherein Strip Attachment Face 52AF is "outer" side of Face Region 50RF, that is, the side of Face Region 50RF that normally faces away from a Chord 14C when the Forming Strip 14F is mated to the Chord 14C as described above.

It will, therefore, be seen from FIGS. 3A-3E that one or more Forming Strips 14F or segments of Forming Strip 14F functioning as Connection Elements 16 can be concurrently mated to any or all of the four faces of a Chord 14C or a segment of a Chord 14C, thereby allowing great flexibility in designing and assembling Components 12 into a Structure 10. In the illustrative example shown in FIG. 3E, for example, three Forming Strip 14F sections are mated to a single section of a Chord 14C wherein the Forming Strip 14F sections are, for example, Connection Elements 16 of other Components 12. As shown, two of the Forming Strip 14F sections are mated in a mirror orientation to opposite sides of the Chord 14C and are mechanically fixed to the Chord 14C by at least one Hex-Bolt 40H extending through the Chord 14C between the outer faces of the irrespective Face Regions 50RF. The third Forming Strip 14F is mated against a third face of the Chord 14C, and is mechanically fixed to the Chord 14C by a T-Bolt 40T inserted into the corresponding T-Slot 46 of that face of the Chord 14C.

It will be appreciated from examination of FIG. 3E, however, that the limitation of the configuration illustrated in FIG. 3E is solely due to the chosen orientations of the Forming Strips 14F with the faces of the Chord 14C and that up to four Forming Strips 14F functioning as, for example, Connection Elements 16, can be accommodated. For example, it may be seen in FIG. 3E that the limitation of the configuration to three Forming Strips 14F arises solely because the Corner Regions 50RC of the two mirror oriented Forming Strips 14F bear against the same face of the Chord 14C, so that if an attempt were made to mate a fourth Forming Strip 14F with the unoccupied face of the Chord 14C the Corner Region 50RC of one or the other of the two already present Forming Strips 14F would mechanically interfere with the Corner Region 50RC of the fourth Forming Strip 14F. It will also be apparent from FIG. 3E, however, that if the orientation of the Forming Strip 14F on the side on which the Hex-Bolt 40H nut is located were reversed, that is, if the Forming Strip 14F were rotated about the Hex-Bolt 40H so that its Corner Region 50RC occupied the presently unoccupied corner of the Chord 14C, a fourth Forming Strip 14F could be accommodated. Stated another way, if the Forming Strips 14F mating with a Chord 14C are oriented with respect to the faces of the Chord 14C such that each corner of the Chord 14C were occupied by a corresponding one of the Corner Regions 50RC of the Forming Strips 14F, then the maximum number of Forming Strips 14F, that is, four Forming Strips 14F, can be mated against the four faces of the Chord 14C. It will be recognized, of course, that any lesser number of Forming Strips 14F can also be mated to a Chord 14C when the Forming Strips 14F are oriented with respect to the faces of the Chord 14C such that each corner of the Chord 14C is occupied by a corresponding one of the Corner Regions 50RC of the Forming Strips 14F.

Next considering the interaction of the bearing surfaces of the Forming Strips 14F and the Chords 14C, and referring in particular to FIG. 3E and FIGS. 3B and 3C jointly, it will be apparent that the design and cross section configuration of a Forming Strip 14F and a Chord 14C are such that the two elements will mate along a plurality of Bearing Surfaces 48A-48H and corresponding Forming Strip Bearing Surfaces 52A-52F. It will also be noted that the mating bearing surfaces are oriented along either of two mutually perpendicular axis wherein, for each face of the Chord 14C, one axis is perpendicular to the face of the Chord 14C and the second axis is parallel to the face of the Chord 14C.

As a consequence, a Forming Strip 14F and a Chord 14C provide a large mutual bearing surface which permits a Forming Strip 14F and a Chord 14C to securely carry corresponding large compression and tension forces. In addition, the distribution of the bearing surfaces along two mutually perpendicular axis also greatly increases the amount of torsional or rotational forces that the Forming Strip 14F and Chord 14C are able to resist and support.

In this regard, it will also be noted that in addition to preventing lateral movement between, for example, a Chord 14C and a segment of Forming Strip 14F functioning as a Connection Element 16, that is, a movement or slip of the Forming Strip 14F along the Chord 14C, T-Bolts 40T and Hex-Bolts 40H exert compressive forces between a Chord 14C and a Forming Strip 14F, thereby resisting tension forces between the Chord 14C and Forming Strip 14F. That is, and as may be seen from FIG. 3A, a Hex-Bolt 40H will exert a compressive force between the outer face of the Face Region 50RF of a Forming Strip 14F bearing against one face of the Chord 14C and either the outer face of the Face Region 50RF of a Forming Strip 14F bearing against the opposite face of the Chord 14C or the outer face of the T-Slot Structure 44T of the opposite face of the Chord 14C. In the case of a T-Bolt 40T, the compressive force will be applied between the outer face of the Face Region 50RF of a Forming Strip 14F bearing against one face of the Chord 14C and the inward facing surfaces of the Slot Face Walls 44F of the T-Slot Structure 44T of the same face of the Chord 14C. It should also be noted that the resistance to lateral movement of the Components 12 in the case of a Hex-Bolt 40H fastening is provided by mechanical interference between the shaft of the Hex-Bolt 40H and the walls of the Bolt Holes 14B. In the instance of a fastening by a T-Bolt 40T, the resistance to lateral movement along the Chord 14C is friction between the mating bearing surfaces while the resistance to lateral sidewise movement is by mechanical interference between the shaft of the T-Bolt 40T and the longitudinal sides of T-Slot 46.

Lastly considering mechanical connections or attachments between Forming Strips 14F and Chords 14C, and as discussed herein above, a Forming Strip 14F will typically include one or more Bolt Holes 14B to allow a Forming Strip 14F, such as a segments of Forming Strips 14F employed as Connection Elements 16 on the ends of other Components 12, to be secured to, for example, a Chord 14C or segment of a Chord 14 by means of T-Bolts 40T or Hex-Bolts 40H. The number an spacing of such Bolt Holes 14B will depend on the length and intended use of the Forming Strip 14F or segment of Forming Strip 14F, by will correspond to the locations, spacings and dimensions of Bolt Holes 14B in the mating Components 12, as discussed herein above.

As shown in FIGS. 3C, 3D and 3E, a Bolt Hole 14B or Bolt Holes 14B will be located in the Face Region 50RF area of a Forming Strip 14F, and will be aligned with the corresponding Shaft T-Slot 46S and any corresponding Bolt Holes 14B through the two facing Main Walls 42W of the Chord 14. This arrangement allows the Forming Strip 14F to be secured to the Chord 14C by means of one or more T-Bolts 40T secured into the T-Slot 46 or by means of a T-Bolt 40T in combination with a Hex-Bolt 40H extending through the Forming Strip 14F and the Chord 14C, as discussed above, or by means of one or more Hex-Bolts 40H.

In this regard, it will be apparent that the number of Bolts 40 in a connection or mating between a Forming Strip 14F and a Chord 14C will depend upon the location of the connection along the Chord 14C. As discussed previously, for example, a Chord 14C or Forming Strip 14F will typically have a pair of relatively closely spaced Bolt Holes 14B at the ends of the Chord 14C or Forming Strip 14F and a number of single Bolt Holes 14B spaced apart by a fixed interval along the length of the Chord 14C or Forming Strip 14F. In presently preferred implementations of the present invention, single Bolt Hole 14B connections along the length of a Chord 14C or Forming Strip 14F are preferably accomplished by means of single T-Bolts 40T while connections by means of the paired Bolt Holes 14B at the ends of the elements are preferably accomplished by a single T-Bolt 40T and a single Hex-Bolt 40H or by two T-Bolts 40T, although these connections may be varied according to circumstances.

D. Exemplary Component 12—Curbing 54

Figure 4A:
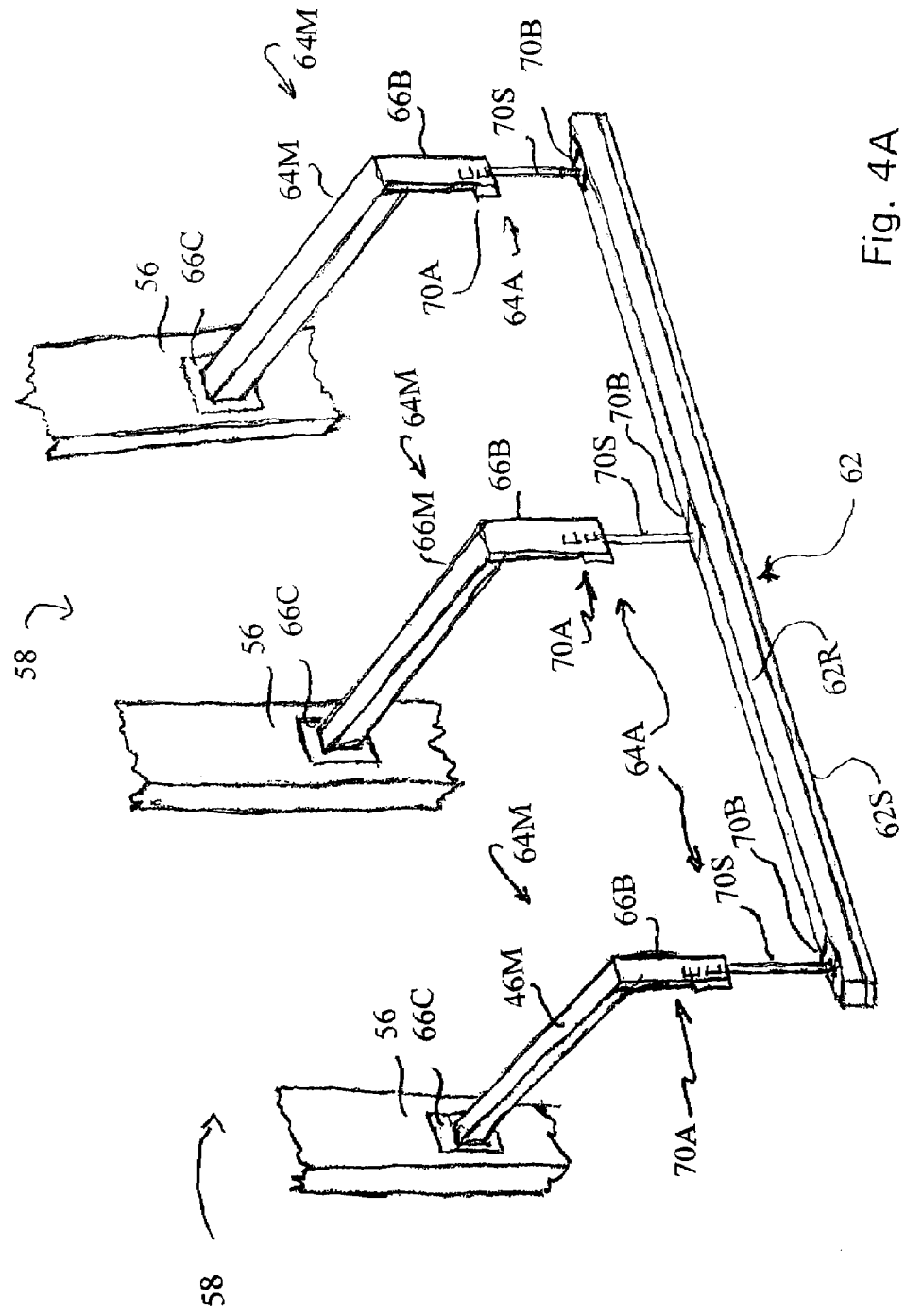
FIG. 4A is a diagrammatic isometric illustration of a curbing component.
Figure 4D:
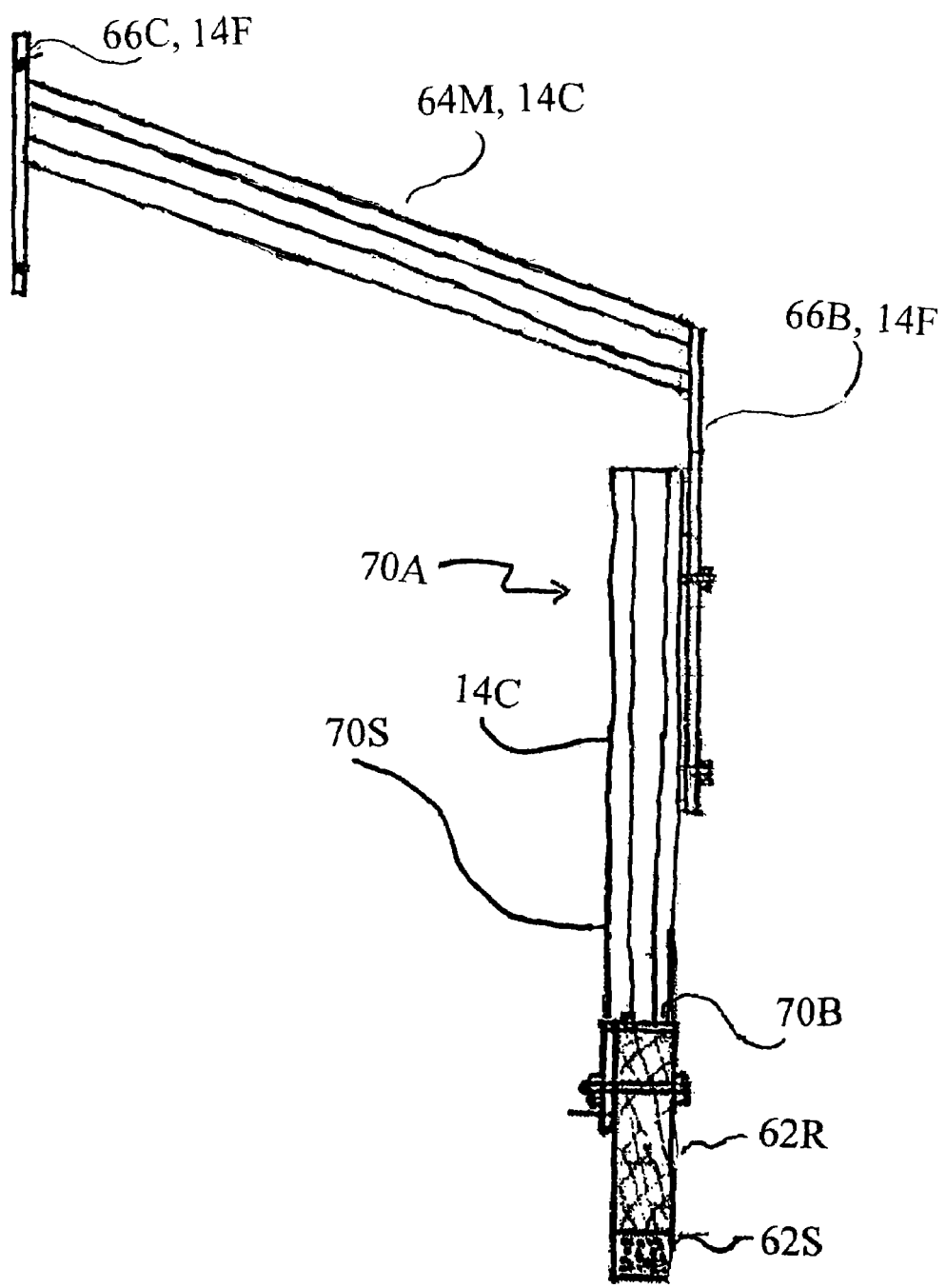
FIG. 4D is a diagrammatic side view of curbing component constructed of chords and forming strips.

Referring now to FIG. 4, therein is shown a Component 12 of the present invention that is referred to as a Curbing 54. As illustrated therein, a Curbing 54 is an adjustable barrier mounted to and extending along the Base Area 56 of a Wall 58 of a Structure 10 and sealably contacting the Ground Surface 60 to prevent the flow of flowable liquid or granular materials into or out of the Structure 10 along the Ground Surface 60. A Curbing 54 may be used, for example, to prevent the entry or escape along the base of a Wall 58 of materials such as water, solvents, petroleum products, sand, dust, paint chips or particles and so on.

As shown in FIG. 4A, a Curbing 54 typically includes a longitudinal Sealing Barrier 62 extending along and spaced outwardly from outside the Base Area 56 of the Wall 58 and two or more Curb Brackets 64 for supporting the Sealing Barrier 62 in a raised position or in a lowered position and for attaching the Curbing 54 to, for example, the vertical main structural members of the Wall 58. It should be noted in this regard that Curb Brackets 64 may alternately be attached to horizontal main structural members of the Wall 58, but with some reduction in the possible vertical movement of the Sealing Barrier 62, as will be apparent from the following discussions.

Each Sealing Barrier 62 can be brought into sealing contact with Ground Surface 60 to prevent the flow of flowable materials into or out of the Structure 10 along the Ground Surface 60, and may be raised to an upper position wherein the Sealing Barrier 62 is spaced vertically above the Ground Surface 60 to allow, for example, movement of the Wall 58 or to create a passage space under the Curbing 54. As shown, each Sealing Barrier 62 includes a Rigid Barrier 62R extending horizontally for the length of the Curbing 54 and forming a barrier or dam preventing movement of flowable materials into or out of a Structure 10, and a Sealer 62S extending along the bottom of Rigid Barrier 62R to form a seal between the bottom of the Rigid Barrier 62R and the Ground Surface 60.

In a typical embodiment of the present invention, a Rigid Barrier 62R is typically comprised of, for example, a wooden timber or an metal beam of some form and which is typically of greater height than width, such as 6 inches by 2 inches, thereby forming a dam against up to six inches of water, for example.

The Sealer 62S is in turn typically comprised of a strip of resilient and largely impermeable material having a width approximating that of the Rigid Barrier 62R and a depth dependent, for example, upon the roughness or unevenness of the Ground Surface 60. In a presently preferred implementation of a Curbing 54, for example, the Sealer 62S is comprised of a multi-cellular foam which may be depressed into the Ground Surface 60 when the Curbing 54 is lowered to press the Sealer 26S into the Ground Surface 60. The multi-cell foam will attempt to expand when contacted by water, for example, thereby forming a waterproof seal between the bottom of the Rigid Barrier 62R and the Ground Surface 60.

Lastly with regard to Sealers 62, it should be noted that a Curbing 54 may be constructed with individual lengths of Rigid Barriers 62R and Sealers 62S placed end to end. Typically and preferably, however, a Curbing 54 will be constructed of a single Rigid Barrier 62R and Sealer 62S of a standard modular length selected from a set of standard modular lengths as this structure will provide the strongest structure with fewer sealing requirements and potential sealing problems than a multi-part structure. It should also be noted that it may be necessary to join Curbs 54, for example, to obtain a curbing having a length greater than the length of the longest modular curbing component or at corners. In these situations, the joints between adjacent and mating Curbing 54 sections may be constructed in any of a number of ways, such as joining mating Rigid Barriers 62R by corner clamps or longitudinal connecting members of various forms and additional Sealers 62S between the vertical edges or ends of the Rigid Barriers 62R.

Next considering the structure of Curb Brackets 64, and as discussed above, the function of Curb Brackets 64 is to support a Sealing Barrier 62 in a position along and spaced outwardly from the Base Area 56 of a Wall 58 and in a raised position or lowered position relative to a Ground Surface 60 and to mount the Curbing 54 to, for example, the vertical main structural members of the Wall 58. As illustrated, a Curb Bracket 64 includes a Mounting Bracket 64M for mounting the Curb 54 to a structural Component 12 of a Wall 58 and an Adjustable Bracket 64A for attaching and adjustably positioning the Sealing Barrier 62 to the Mounting Bracket 64M.

The Mounting Bracket 64M in turn includes a Main Support 66M, which may be a section of Forming Strip 14F or a section of Chord 14C, and which is attached to a Mounting Connector 66C which mates with a vertical Structural Element 68 of the Wall 58. As has been described, the vertical Structural Element 68 will typically be comprised of a Chord 14C, and the Mounting Connector 66C will thereby typically be a section of Forming Strip 14F with the Mounting Connector 66C 16 being mated to the vertical Structural Element 68 by means of T-Bolts 40T, as previously described. The Mounting Connector 66C and thus the Mounting Bracket 64M may thereby be adjustably positionable along the vertical axis of the Structural Element 68, thereby allowing an initial adjustment of the vertical position of the Curbing 54 with respect to the Structural Element 68 and Ground Surface 60.

Main Support 66M slants downward and outward from Mounting Connector 66C to a vertical Barrier Mounting Plate 66B to which Adjustable Bracket 64A, which supports Sealing Barrier 62, is adjustably mounted. As will be described, the connection between Adjustable Bracket 64A and Barrier Mounting Plate 66B is vertically adjustable, so that the vertical position of Sealing Barrier 62 with respect to both the vertical Structural Element 68 and the Ground Surface 60 is thereby adjustable and fixable by means of the vertical adjustment provided between Adjustable Bracket 64A and Barrier Mounting Plate 66B.

It should also be noted that the outward and downward slope of Main Support 66M both provides a structurally stronger assembly and provides space for rotation of one or more wheel assemblies, such as Wheel Assembly 38, when Wall 58 or the Structure 10 is constructed to be moveable on wheels. The configuration of Main Support 66M also provides an eave-like structure that, for example, could be covered by a Membrane 12M, such as plastic sheeting, to deflect rain or other matter away from the base of the Wall 58 and to the outside of the Sealing Barrier 62.

Referring to Barrier Mounting Plate 66B and Adjustable Brackets 64A in further detail, and as illustrated in the implementation of a Curbing 54 shown in FIG. 4B and in the face view of an exemplary Barrier Mounting Plate 66B as shown in FIG. 4C, Barrier Mounting Plate 66B may be comprised of a flat metal plate having two C-shaped C-Slots 66S arranged vertically with respect to one another. The width of each C-Slot 66S is dimensioned to accept the shaft of a Bolt 40, such as a T-Bolt 40T or a Hex-Bolt 40H, so that the vertical position of Bolts 40 passing through the C-Slots 66S may be adjusted by sliding the Bolts 40 along C-Slots 66S from the upper or lower horizontal sections of the C-Slots 66S and along the vertical sections of the C-Slots 66S to the other of the upper and lower sections of the C-Slots 66S. As described below, Adjustable Bracket 64A is mounted from the Bolts 40 extending through Barrier Mounting Plate 66B and C-shaped C-Slots 66S, so that the vertical position of Sealing Barrier 62 with respect to Main Support 66M and thus with Ground Surface 60 is thereby adjustable by the vertical distance between the two horizontal slot segments of the C-Slots 66S. In particular, C-Slots 66S allow a Sealing Barrier 62 that is adjusted to be in sealing contact with the Ground Surface 60 to be quickly raised by the vertical distance between the two horizontal slot segments of the C-Slots 66S to allow, for example, movement of the Wall 58 or Structure 10 or to form a passage under the Sealing Barrier 62, and to be as quickly returned to contact with the Ground Surface 60.

Now referring to Adjustable Bracket 64A in further detail, it is illustrated in FIG. 4B that in a typical implementation an Adjustable Bracket 64A includes an Adjustable Support 70S having an upper end mounted to Barrier Mounting Plate 66B by means of Adjustable Mounting 70A and a lower end attached to the Rigid Barrier 62R by means of a Barrier Bracket 70B. In a present implementation of the present invention Adjustable Support 70S is comprised of a threaded metal rod and Adjustable Mounting 70A includes a C-Bracket 70C having a vertical Bracket Body 72B and two horizontally extending and vertically spaced part Bracket Arms 72A. The two Bracket Arms 72A each have an Support Opening 72O through which Adjustable Support 70S passes, with the upper and lower Support Openings 72O being vertically aligned. As indicated, Adjustable Fasteners 70F, such as nuts, are mounted on Adjustable Support 70S above and below Bracket Arms 72A of C-Bracket 70C and bear against Bracket Arms 72A to fix the vertical length of Adjustable Support 70S between C-Bracket 70C and Sealing Barrier 62, thereby determining the vertical position of Sealing Barrier 62 with respect to Mounting Bracket 64M. It will be understood that the adjustable nature of Adjustable Fasteners 70F allow the position of Adjustable Support 70S with respect to C-Bracket 70C, and thus allows the length of Adjustable Support 70S between C-Bracket 70C and Sealing Barrier 62 to be adjusted within a vertical range determined by the length of Adjustable Support 70S.

In the illustrated exemplary embodiment of Adjustable Mounting 70A shown in FIG. 4B, C-Bracket 70C is shown as being attached to a Bolt Plate 72P, which in turn has openings to receive the Bolts 40 extending through C-Slots 66S of Barrier Mounting Plate 66C, so that the vertical position of Bolt Plate 72P and thus of C-Bracket 70C is fixed at one or the other of the vertical locations of the upper and lower horizontal slot segments of C-Slot 66S. As described, therefore, the Bolts 40 extending through the C-Slots 66S and holding Bolt Plate 72P may thereby be loosened to adjust the vertical position of the Sealing Barrier 62 upwards or downwards by the vertical distance between the upper and lower C-Slots 66S.

It will be appreciated that Adjustable Mounting 70A may be implemented in a number of different ways. For example, C-Bracket 70C and Bolt Plate 72B may be made as a single component, such as as a C-Bracket 70C that is expanded to include the appropriate openings for the Bolts 40 and to provide the desired bearing surface against the back surface of Barrier Mounting Plate 66C.

In addition, it will be appreciated that the structure comprising Barrier Mounting Plate 66B and Adjustable Mounting 70A, including Adjustable Support 70S and C-Bracket 70C, can be readily implemented with the Chords 14C and Forming Strips 14F of the present invention. For example, and as illustrated in FIG. 4C, the Adjustable Mounting 70A, including Adjustable Support 70S and C-Bracket 70C, can be implemented by means of a single segment of Chord 14C having a length generally equal to that of the Adjustable Support 70S and with Barrier Bracket 70B attached to the lower end of the Chord 14C. The function of Barrier Mounting Plate 66B and C-Bracket 70C can, in turn, be implemented by constructing the Barrier Mounting Plate 66B from a segment of Forming Strip 14F mating with the segment of Chord 14C that performs the function of C-Bracket 70C and Adjustable Support 70S and being adjustably mounted to the Chord 14C by means of T-Bolts 40T. As described herein above, the T-Bolts 40T would thereby allow the force clamping the Chord 14C and Forming Strip 14F together to be increased or decreased by tightening or loosening the T-Bolts 40T. The vertical position of the Sealing Barrier 62 can thereby be adjusted to any point along the adjustment range of the Chord 14C by sliding the T-Bolts 40T along the T-Slot 46, and fixed in a chosen position by tightening the T-Bolts 40T.

Since certain changes may be made in the above described method and system without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. In a system including a plurality of types of modular structural components for construction of structures, each structural component including at least one of a plurality of structural elements, a curbing component to prevent the entry and escape of flowable materials into and out of the structure along a ground surface, the curbing component comprising:
    a sealing barrier positionable along the ground surface and parallel to a wall of the structure and forming a sealed barrier with the ground surface to prevent the passage of the flowable materials along the ground surface and beneath the sealing barrier, including
        a rigid barrier forming a barrier against the passage of the flowable material, and
        a sealer mounted on a lower surface of the rigid barrier and forming a seal between the rigid barrier and the ground surface to prevent the passage of flowable material under the rigid barrier,
    a curbing bracket for adjustably mounting the sealing barrier to a lower portion of the wall, including
        an adjustable bracket for support and vertical positioning of the sealing barrier with respect to the ground surface, including
            an adjustable support having a barrier bracket on a lower end thereof for attachment of the rigid barrier thereto, and
            an adjustable mounting for receiving an upper end of the adjustable support and adjustably determining a downward extension of the adjustable support from the adjustable mounting, and
        a mounting bracket extending downwards and outwards from the wall for mounting the adjustable bracket to the lower part of the wall, including
            a main support extending downwards and outwards from the wall,
            a mounting connector for mounting the main support to a structural element of the wall, and
            a mounting plate extending downwards from the main support and having a quick release connection for supporting the adjustable mounting in either of two selectable vertical positions with respect to the mounting plate.

2. The curbing component of claim 1, wherein:
the mounting connector of the mounting bracket is a forming strip mating with a chord forming the structural element of the wall,
the mounting plate of the mounting bracket is a forming strip, and
the adjustable support and adjustable mounting of the adjustable bracket are a segment of chord mating with the mounting bracket forming strip and adjustably connected thereto by a T-bolt.

* * * * *